United States Patent
Soumiya et al.

(10) Patent No.: US 7,564,778 B2
(45) Date of Patent: Jul. 21, 2009

(54) METHOD OF AND CONTROL NODE FOR DETECTING FAILURE

(75) Inventors: Toshio Soumiya, Kawasaki (JP); Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 10/840,694

(22) Filed: May 6, 2004

(65) Prior Publication Data

US 2005/0122908 A1    Jun. 9, 2005

(30) Foreign Application Priority Data

Dec. 9, 2003   (JP)   ............................. 2003-410257

(51) Int. Cl.
*G01R 31/08*   (2006.01)
(52) U.S. Cl. ........................ 370/221; 370/225; 370/244; 370/470
(58) Field of Classification Search ................ 370/241, 370/221, 225, 244, 470
See application file for complete search history.

(56) References Cited

U.S. PATENT DOCUMENTS

| | | | |
|---|---|---|---|
| 6,618,648 | B1 * | 9/2003 | Shirota et al. ................ 700/291 |
| 7,333,424 | B2 | 2/2008 | Yamanaka |
| 2004/0114524 | A1 * | 6/2004 | Depta et al. ................... 370/241 |
| 2005/0063701 | A1 * | 3/2005 | Ovadia et al. .................. 398/45 |
| 2005/0089027 | A1 * | 4/2005 | Colton ......................... 370/380 |
| 2006/0126503 | A1 * | 6/2006 | Huck et al. ................... 370/225 |

FOREIGN PATENT DOCUMENTS

| | | |
|---|---|---|
| JP | 08-256147 | 10/1996 |
| JP | 11-205318 | 7/1999 |
| JP | 2003-508971 | 3/2001 |
| JP | 2002-353907 | 12/2002 |
| JP | 2003-092626 | 3/2003 |
| JP | 2003258908 | 9/2003 |

OTHER PUBLICATIONS

Japanese Office Action dated Mar. 10, 2009 for the corresponding Japanese Application 2003-410257.
Kohei Shimoto, et al., "Study of photonic IP network architecture", Technical Report of IEICE, Dec. 2001, pp. 127-132, NTT Network Innovation Laboratories, Musashino, Japan.
Jonathan P. Lang, et al., "Link management protocol", Sep. 2001, pp. 15-18, Network Working Group Internet Draft, expiration Sep. 2001, http://toos.ietf.org/html/draft-ietf-mpls-imp-02#section-6.2.

* cited by examiner

*Primary Examiner*—Brenda Pham
*Assistant Examiner*—Sai-Ming Chan
(74) *Attorney, Agent, or Firm*—Katten Muchin Rosenman LLP

(57) ABSTRACT

A method of detecting a failure in a network, which includes a transport plane comprised of a plurality of communication nodes performing optical cross-connect and a control plane comprised of a plurality of control nodes that are connected to and control the respective communication nodes, includes the steps of transmitting, from a control node connected to a communication node having detected a failure to an adjacent control node, a failure information message having a time indication indicative of a time at which the failure is detected, and identifying, at a given control node which received the failure information message, a location of the failure in response to the time indication.

16 Claims, 20 Drawing Sheets

FIG.7A

| COMMON HEADER | MESSAGE IDENTIFIER | LIFE TIME | FAILURE TYPE | FAILED NODE IDENTIFIER | TIME STAMP | FAILED LINK IDENTIFIER (STATUS) | ......... |

FIG.7B

| COMMON HEADER | RESPONSE MESSAGE IDENTIFIER |

FIG.13A

| COMMON HEADER | MESSAGE IDENTIFIER |
|---|---|

FIG.13B

| COMMON HEADER | RESPONSE MESSAGE IDENTIFIER | LIFE TIME | FAILURE TYPE | FAILED NODE IDENTIFIER | TIME STAMP | FAILED LINK IDENTIFIER (STATUS) | ......... |

METHOD OF AND CONTROL NODE FOR DETECTING FAILURE

BACKGROUND OF THE INVENTION

1. Field of the Invention

The present invention generally relates to a method of and apparatus for detecting a network failure, and particularly relates to a method of and an apparatus for detecting a failure of an optical network.

2. Description of the Related Art

Network traffic has been increasing at a rapid rate, and, also, there has been the emergence of services such as VoIP (Voice over Internet Protocol) that require real-time properties. Against this background, there is an urgent need for the provision of a transport network that achieves high capacity and flexible network control.

In order to provide such network, it is necessary to incorporate IP technology capable of flexible network control into a transport network. Organizations for standardization have been studying relevant network architectures and the detail of protocols.

The formulation of specifications for the GMPLS (generalized MPLS) signaling protocol has been underway where the GMPLS expands the structure of MPLS (multi-protocol label switching) by introducing structures developed for conventional router networks into a transport network. As shown in FIG. 1, a IP-based control plane 2 is introduced into a transport network 1 for the purpose of setting wavelength paths, SONET/SDH channels, etc., by use of signaling.

Such a network in which the IP-based control plane 2 is utilized for the existing transport plane 1 is useful for the purpose of establishing a future core network, and its further development is expected.

When recovery from failure needs to be made in the network as shown in FIG. 1, a backup path is generally provided at the time a path for current use is provided in the transport plane 1, or a backup path is provided based on the routing computation performed at the time of failure occurrence. In recovering from failure, a point of failure is identified, and control for recovering from the failure is performed.

Technologies for failure identification include the following. A first one is a method of identifying a failure point based on ITU-T recommendation G.709. This method transmits a failure notification message by use of hardware, and allows exchanges of the failure notification message in each optical layer, thereby achieving high-speed failure detection and identification. For example, if an optical fiber is severed, signals for failure notification travel between layers for optical transmission such as an OMS (optical multiplexing section) and an Och (optical channel). This makes it possible to identify which portion of which layer suffered a failure.

A second one is a method based on the LMP (Link Management Protocol) of the IETF (Internet Engineering Task Force) standard. The LMP provides a function to localize a failure point in an optical network. When a failure is detected in the LMP, an inquiring message is sent upstream, and a response is sent back from upstream to identify a failure point.

Moreover, technologies for detecting network failure include those described in Patent Documents 1-3.

Patent Document 1 teaches identifying a main cause reported from a transmission apparatus being monitored in an integrated network management system, which is comprised of a plurality of sub-network management systems and a network management system for consolidating these systems.

Patent Document 2 teaches carrying out signaling via a control network and establishing/canceling connections through a transmission network when communication connections are to be established/canceled.

Patent Document 3 teaches a control unit of an exchange that is connected to a network control apparatus through an exchange control network, wherein the control unit responds to a request for information transfer given from the network control apparatus by detecting unused timeslots on a highway connected to the transfer destination and by transmitting maintenance information through the unused timeslots.

[Patent Document 1] Japanese Patent Application Publication No. 11-205318
[Patent Document 2] Japanese Patent Application Publication No. 2003-508971
[Patent Document 3] Japanese Patent Application Publication No. 2003-92626

The first method based on the ITU-T recommendation G.709 needs optical-to-electrical conversion at each node of the transport plane 1. Because of this limitation, this method cannot be applied to a network in which all the paths are cross-connected through optical signals. In such a network, path switch is possible for recovery from failure only between edge nodes where optical-to-electrical conversion is performed. This method of recovering from failure cannot be applied if relay nodes that do not perform optical-to-electrical conversion are required to set a detour route according to the method.

The second method based on the LMP requires messages to be exchanged both ways with an adjacent node, which results in a lengthy delay. Further, this method cannot cope with a node failure, i.e., cannot detect a node failure.

In the technology described in Patent Document 1, no control plane is present, and the integrated network management system identifies a main cause reported by a transmission apparatus that is being monitored. In the technology described in Patent Document 2, a transfer network and a control network are separated, but there is no mention of identifying a failure point in the transmission network. Patent Document 3 inserts maintenance information into unused timeslots of a transmission path for transmission. This is different from identifying a failure location by transmitting a failure information message on the control plane.

Accordingly, there is a need for a method of and an apparatus for detecting a network failure that can detect a node failure with a short delay of failure detection in a network where cross-connect is provided through optical signals.

SUMMARY OF THE INVENTION

It is a general object of the present invention to provide a method of and a control node for detecting a failure that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a method of and a control node for detecting a failure particularly pointed out in the specification in such full, clear, concise, and exact terms as to enable a person having ordinary skill in the art to practice the invention.

To achieve these and other advantages in accordance with the purpose of the invention, the invention provides a method of detecting a failure in a network, which includes a transport plane comprised of a plurality of communication nodes performing optical cross-connect and a control plane comprised of a plurality of control nodes that are connected to and control the respective communication nodes. The method includes the steps of transmitting, from a control node connected to a communication node having detected a failure to an adjacent control node, a failure information message having a time indication indicative of a time at which the failure is detected, and identifying, at a given control node which received the failure information message, a location of the failure in response to the time indication.

The method described above eliminates a need to exchange a message both ways between control nodes, thereby reducing a delay associated with the detection of a failure.

According to another aspect of the invention, a method of detecting a failure in a network, which includes a transport plane comprised of a plurality of communication nodes performing optical cross-connect and a control plane comprised of a plurality of control nodes that are connected to and control the respective communication nodes, includes the steps of transmitting a failure information message from a control node connected to a communication node having detected a failure to a control node that is situated downstream on a path along which the failure is detected, and identifying a given control node as a location of the failure if the given control node has transmitted the failure information message and has not received the failure information message from upstream on the path.

The method as described above eliminates a need to exchange a message both ways between control nodes, thereby reducing a delay associated with the detection of a failure.

According to another aspect of the invention, a method of detecting a failure in a network, which includes a transport plane comprised of a plurality of communication nodes performing optical cross-connect and a control plane comprised of a plurality of control nodes that are connected to and control the respective communication nodes, includes the steps of transmitting a failure information message from a control node connected to a communication node having detected a failure to a control node that is situated upstream on a path along which the failure is detected, and identifying a given control node as a location of the failure if the failure information message has been transmitted to the given control node and no response thereto has been received from the given control node.

The method as described above can detect a link failure.

According to another aspect of the invention, a method of detecting a failure in a network, which includes a transport plane comprised of a plurality of communication nodes performing optical cross-connect and a control plane comprised of a plurality of control nodes that are connected to and control the respective communication nodes, includes the steps of transmitting a failure information message from a control node connected to a communication node having detected a failure to a control node that is situated upstream on a path along which the failure is detected, checking, at a control node having received the failure information message, whether a communication node connected thereto suffers a failure, transmitting a result of the checking to a control node from which the failure information message is received, and identifying the failure based on the result of the checking.

The method described above can detect a node failure.

According to another aspect of the invention, a control node for detecting a failure in a network, which includes a transport plane comprised of a plurality of communication nodes performing optical cross-connect and a control plane comprised of a plurality of control nodes that are connected to and control the respective communication nodes, includes a failure information message transmitting unit which generates a failure information message having a time indication indicative of a time at which a failure is detected in response to a notice supplied from a communication node connected to the control node, and transmits the failure information message to an adjacent control node, and a failure-point identifying unit which identifies a location of the failure by identifying a failure information message having a time indication indicative of an earliest time amongst failure information messages received from other control nodes.

BRIEF DESCRIPTION OF THE DRAWINGS

Other objects and further features of the present invention will be apparent from the following detailed description when read in conjunction with the accompanying drawings, in which:

FIGS. 7A and 7B are drawings showing the format of a failure information message and the format of a response message according to the first embodiment;

FIGS. 13A and 13B are drawings showing the format of a failure information message and the format of a response message according to the second embodiment;

DESCRIPTION OF THE PREFERRED EMBODIMENTS

In the following, embodiments of the present invention will be described with reference to the accompanying drawings.

Figure 1:
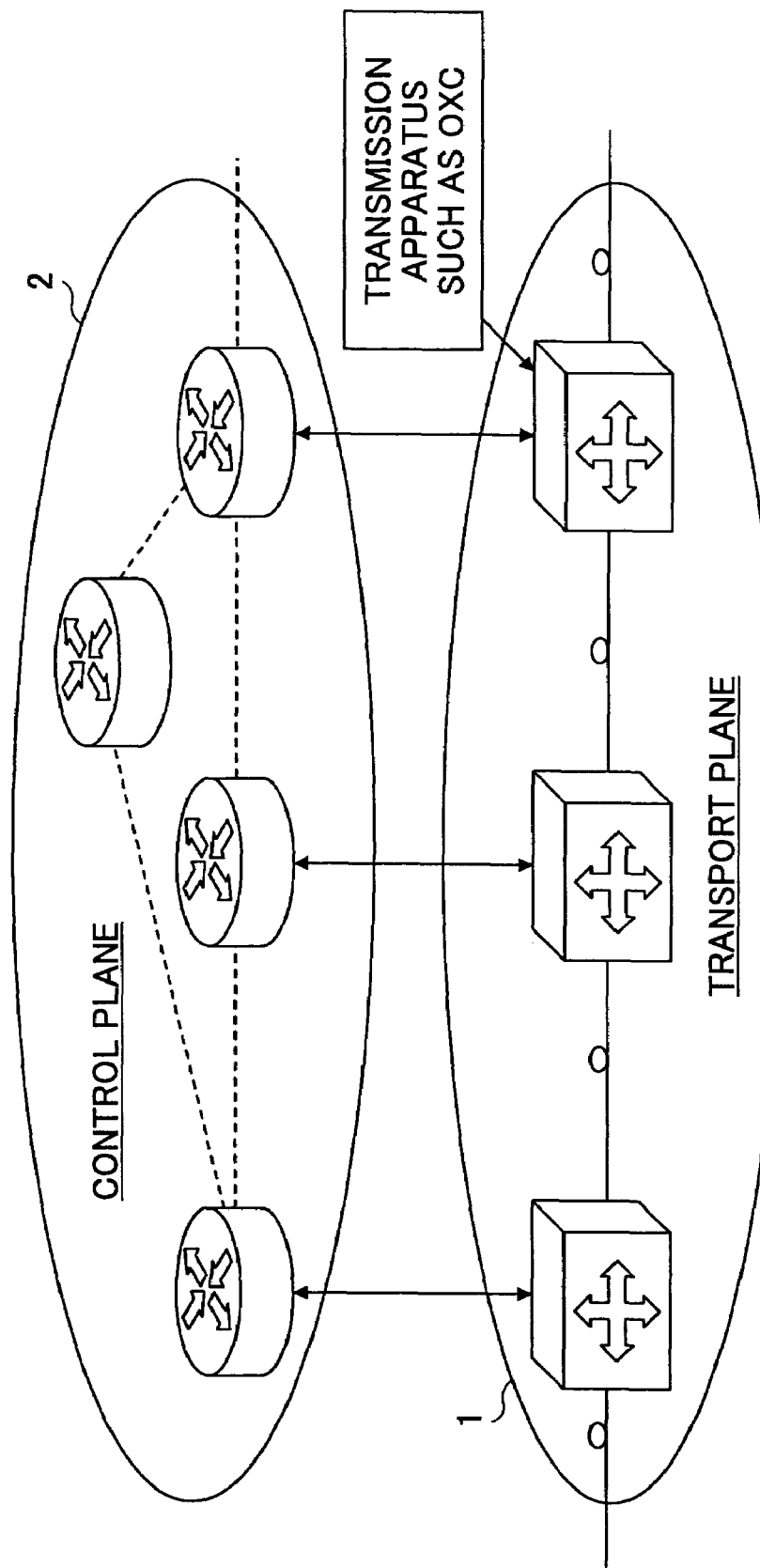
FIG. 1 is an illustrative drawing showing an example of a network construction.
Figure 2:
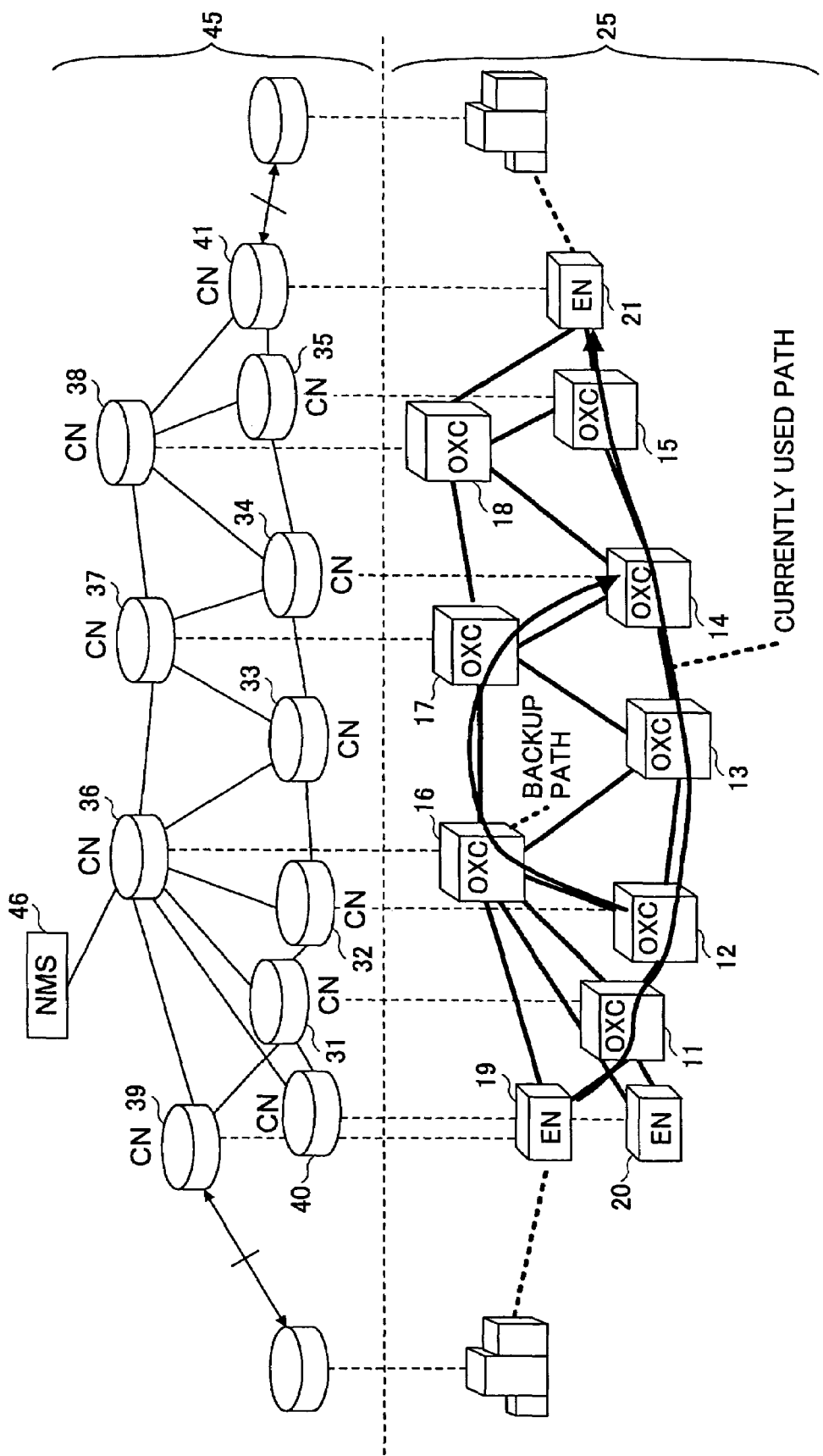
FIG. 2 is an illustrative drawing showing the construction of a network for explaining a method of detecting network failure according to the invention.

FIG. 2 is an illustrative drawing showing the construction of a network for explaining a method of detecting network failure according to the invention.

The network of FIG. 2 includes a transport plane 25 comprised of optical cross-connects (OXC) 11-18 and edge nodes (EN) 19-21 that have an electrical cross-connect function and an optical/electrical conversion function, and further includes a control plane 45 comprised of control nodes (CN) 31-41 which are connected to these network elements for control purposes. Moreover, a network management system (NMS) 46 is connected to one of the control nodes (for example, 36) of the control planes 45.

Almost all the routes in this network are cross-connected through optical signals by use of the optical cross-connects 11-18. Communication nodes constituting the transport plane, i.e., the optical cross-connects 11-18 and the edge nodes 19-21, are connected to the control nodes 31-41.

A path of current use is established between the edge nodes 19 and 21. Further, a backup path for recovering from a failure of the currently used path is provided through a route different from that of the currently used path. For example, a backup path for bypassing a failure between the optical cross-connects 12 and 13 may be provided through a path along the optical cross-connects 12, 16, 17, and 14.

Figure 3:
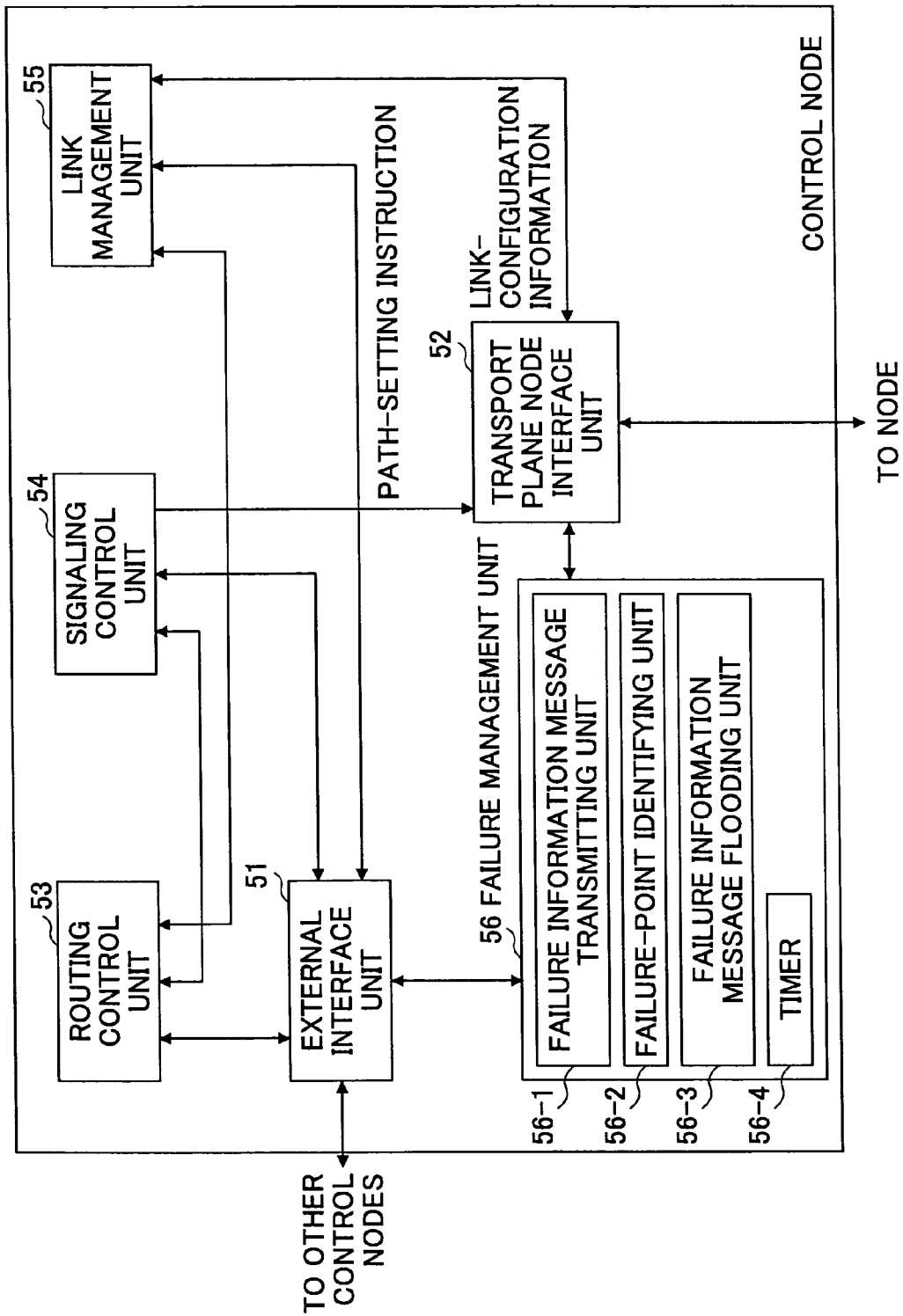
FIG. 3 is a block diagram of an embodiment of a control node.

FIG. 3 is a block diagram of an embodiment of a control node. In FIG. 3, the control node is coupled to other control nodes through an external interface unit 51. With this, communication between control nodes is performed through the IP (Internet Protocol), Ethernet (registered trademark), or the like. A network management system may also be connected to the external interface unit 51. Moreover, the control node is connected to a communication node of the transport plane through a transport plane node interface unit 52. The external interface unit 51 is connected to a routing control unit 53, a signaling control unit 54, a link management unit 55, and a failure management unit 56.

In normal and routine operations, control information is exchanged with other control nodes through the external interface unit 51. The link management unit 55 attends to link management between adjacent control nodes, and identifies what resources are provided in the counterpart control nodes. The routing control unit 53 exchanges topology information with adjacent control nodes, so that each control node learns the topology of the network.

When the topology is known, the signaling control unit 54 attends to path setting automatically or in response to a command from maintenance personnel. The control node then sends control information about path settings to the communication node of the transport plane through the transport plane node interface unit 52.

If a failure occurs in the communication node controlled by the control node of interest, information about the failure is sent from the communication node to the transport plane node interface unit 52 provided in the control node of interest. This information about the failure is then sent to the failure management unit 56.

The failure management unit 56 refers to the topology information held by the routing control unit 53, and transmits a failure notification message to relevant control nodes. A failure notification message sent from other control nodes is processed by the failure management unit 56 in the same manner. If the control node of interest is situated at a switching end, a switch instruction is sent to the communication nodes controlled by the control node of interest for switching of paths. The detail of path switching is reported to the routing control unit 53 and the signaling control unit 54.

It should be noted that the failure management unit 56 may include a failure information message transmitting unit 56-1 which generates and transmits a failure information message, a failure-point identifying unit 56-2 which identifies the location of the failure, a failure information message flooding unit 56-3 which performs flooding, and a timer 56-4 which indicates the passage of a predetermined time period. The operation of these units will be described later in connection with the relevant processes of the failure management unit 56.

If the maintenance personnel sets up a path, a path setting instruction is sent from the network management system 46 to the control node. The signaling control unit 54 of the control node sets up a path according to the instruction sent from the network management system 46, and returns an acknowledgement to the network management system 46 after the completion of path setting.

Figure 4:
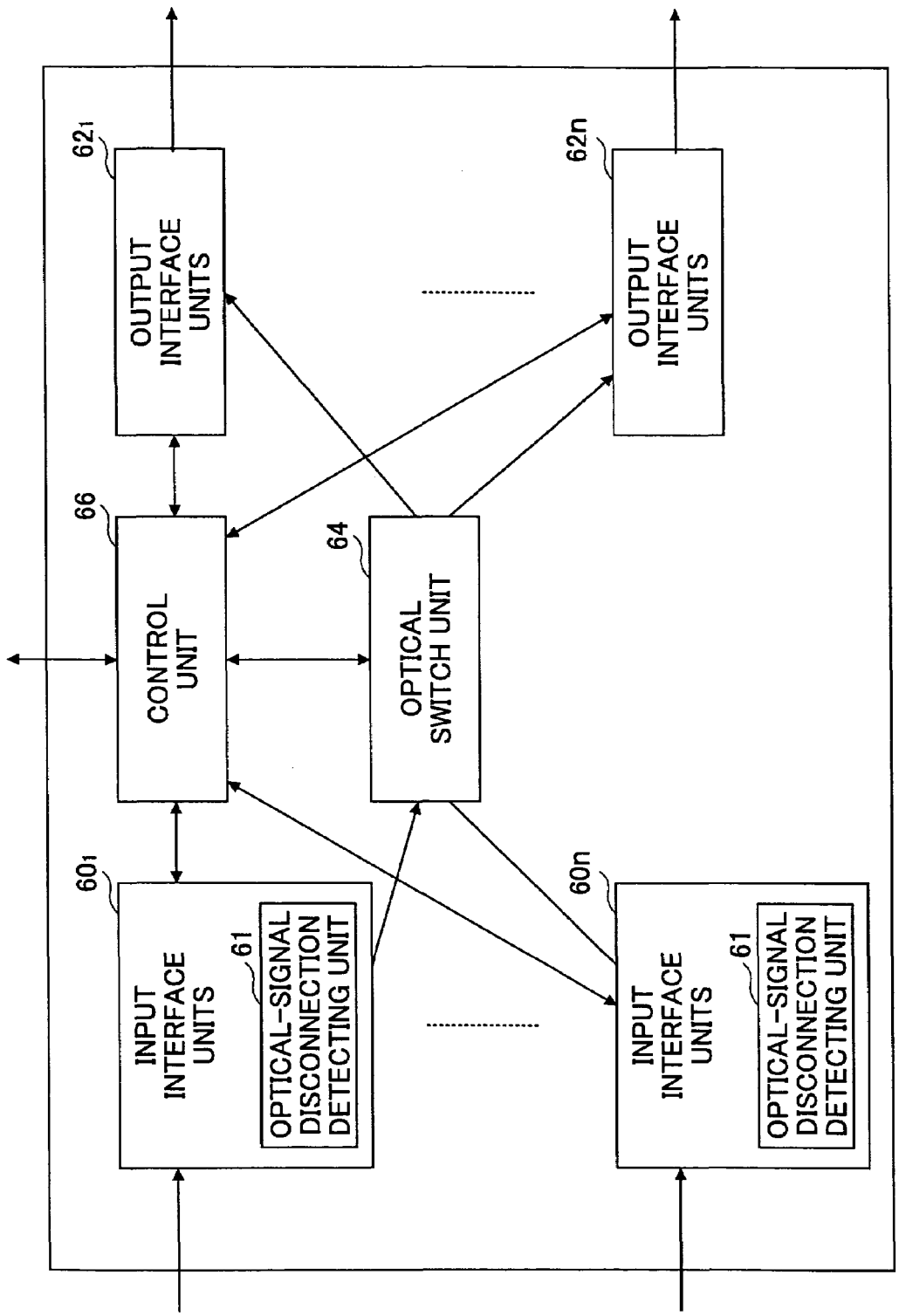
FIG. 4 is a block diagram showing an embodiment of a communication node.

FIG. 4 is a block diagram showing an embodiment of a communication node. The communication node of FIG. 4 is connected to other communication nodes through input interface units $60_1$-$60_n$ and output interface units $62_1$-$62_n$. Each of the input interface units $60_1$-$60_n$ is provided with an optical-signal disconnection detecting unit 61. Optical signals received by the input interface units $60_1$-$60_n$ are supplied to an optical switch unit 64, and are switched separately for each optical path according to control of the control unit 66 to be supplied to the output interface units $62_1$-$62_n$. The output interface units $62_1$-$62_n$ then transmit the optical signals to next communication nodes separately through each optical path.

The control unit 66 is connected to the control node, and attends to switching control of the optical switch unit 64 according to the control information supplied from the control node. Moreover, upon the reception of an optical-disconnection detection signal from any of the optical-signal disconnection detecting units 61 of the input interface units $60_1$-$60_n$, the control unit 66 reports this to the control node. Further, the control unit 66 generates a failure detection signal when a failure occurs in the communication node of interest, and notifies the control node of the failure.

Figure 5:
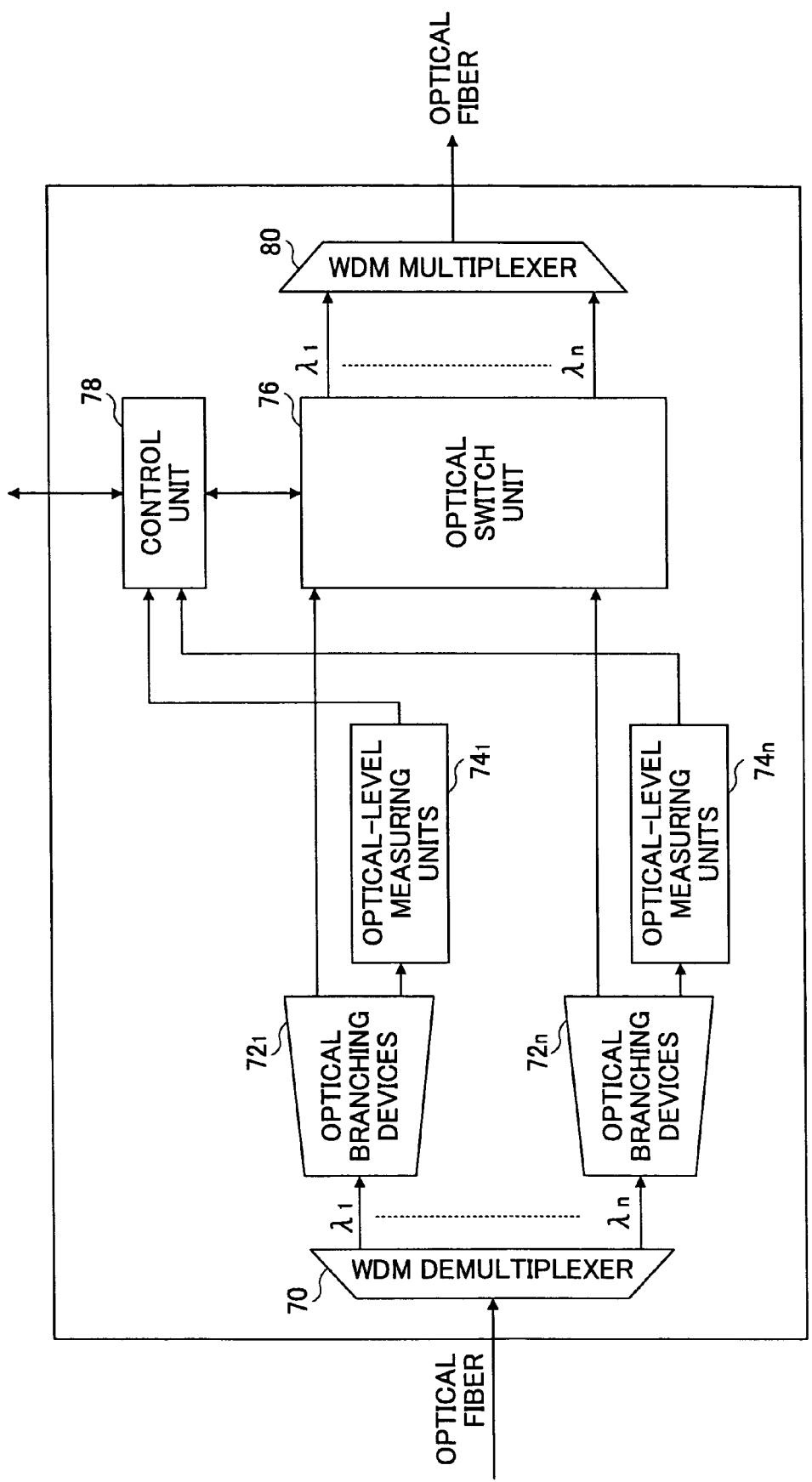
FIG. 5 is a block diagram of another embodiment of the communication node.

FIG. 5 is a block diagram of another embodiment of the communication node. The communication node of FIG. 5 includes a WDM (wavelength division multiplexing) demultiplexer 70, optical branching devices $72_1$-$72_n$, optical-level measuring units $74_1$-$74_n$, an optical switch unit 76, a control unit 78, and a WDM multiplexer 80.

The WDM (wavelength division multiplexing) demultiplexer 70 demultiplexes a wavelength multiplexed optical signal arriving via the optical fiber into respective wavelengths, and supplies the respective wavelengths $\lambda 1$-$\lambda n$ to the optical branching units $72_1$-$72_n$. The optical branching units $72_1$-$72_n$ divide the optical signal of the respective wavelengths into the two paths. One is led to the optical switch unit 76, and the other one is led to the optical-level measuring units $74_1$-$74_n$.

The optical-level measuring units $74_1$-$74_n$ measure the magnitude level of the optical signals having the respective wavelengths $\lambda 1$-$\lambda n$, and generate an optical disconnection detection signal if the magnitude level of the respective wavelengths $\lambda 1$-$\lambda n$ is smaller than a predetermined threshold. The generated signal is sent to the control unit 78.

The optical switch unit 76 switches the optical signals of respective wavelengths under the control of the control unit 78 for transmission to the WDM multiplexer 80. The wavelength multiplexed optical signal multiplexed by the WDM multiplexer 80 is transmitted through the optical fiber towards a next communication node.

When an optical disconnection detection signal is supplied from the optical-level measuring units $74_1$-$74_n$, the control unit 78 notifies the control node of this event. Also, the control unit 78 generates a failure detection signal for notification to the control node if a failure occurs in the communication node of interest.

Figure 6:
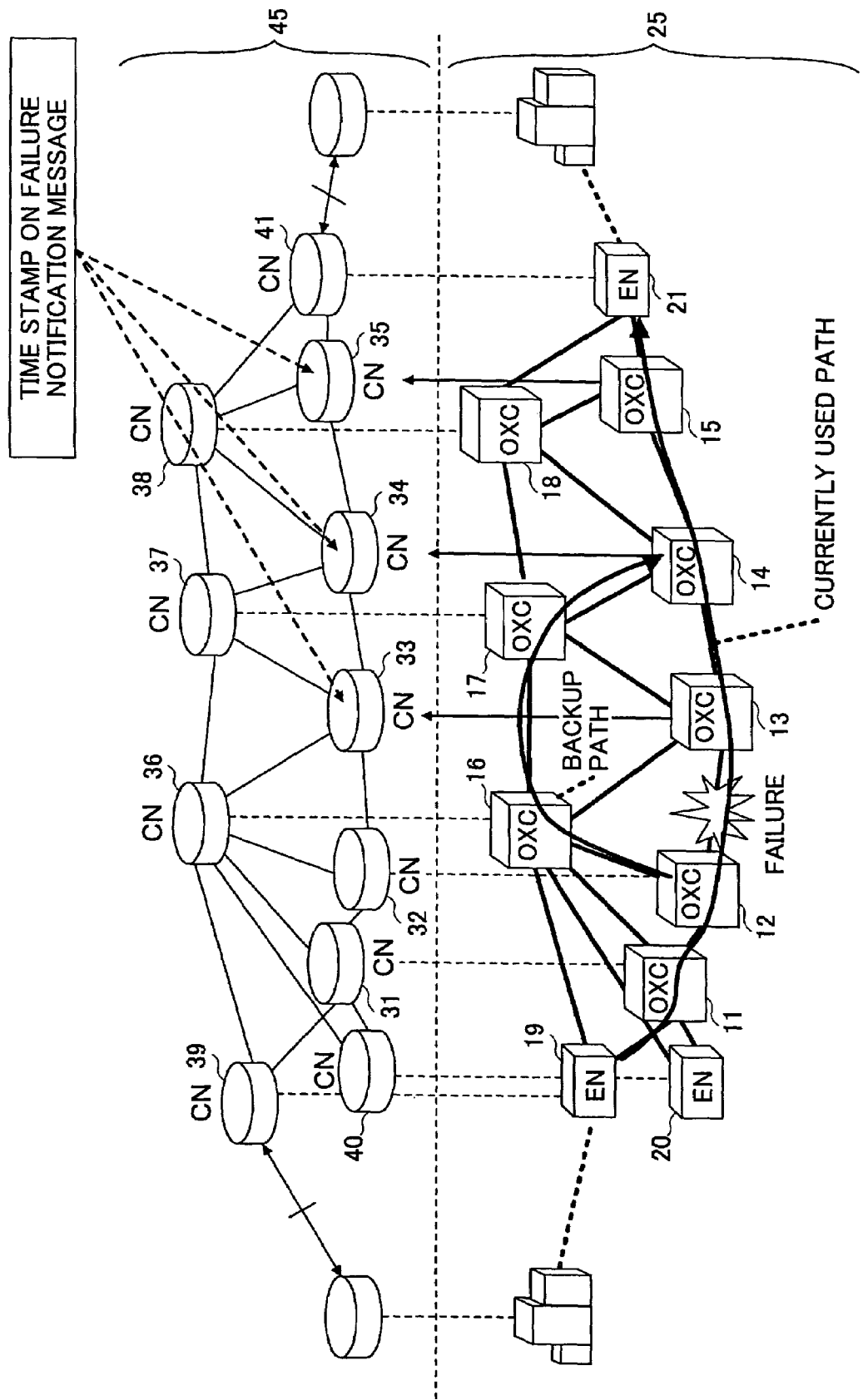
FIG. 6 is an illustrative drawing showing the construction of a network for explaining a first embodiment of a method of detecting a link failure according to the invention.

FIG. 6 is an illustrative drawing showing the construction of a network for explaining a first embodiment of a method of detecting a link failure according to the invention. In FIG. 6, the same elements as those of FIG. 2 are referred to by the same numerals. In FIG. 6, when an optical signal is disconnected due to link severance between the optical cross-connects 12 and 13, all the optical cross-connects 13, 14, and 15 provided downstream relative to the point of link severance detect an optical disconnection failure. Here, the term "downstream" refers to a direction from a start node of a path to an end node that terminates the path. The term "upstream" is used to refer to an opposite direction.

For the purpose of bypassing the failure, a backup path provided along the optical cross-connects 12, 16, 17, and 14 can be used. The point of a failure, however, needs to be identified first. To this end, failure information transmitted by the control nodes 33, 34, and 35 is given respective time stamps when failure detection signals are reported to the control plane. Failure information messages are then exchanged in the control plane so as to identify the point of failure.

The control nodes 31-41 obtain time information by use of the GPS (global positioning system), for example. An example of a time information generating device based on the GPS is a 10-MHz standard signal generator (MODEL3272D) of a GPS synchronous type, which is provided by Japan Communication Equipment Co., Ltd. Alternatively, a cesium atomic clock or the like may be used.

FIGS. 7A and 7B are drawings showing the format of a failure information message and the format of a response message according to the first embodiment. As shown in FIG. 7A, a failure information message includes a common header of the communication protocol used by control nodes, a message identifier indicative of a failure information message, a life time indicative of the number of nodes for which transfer is possible, a failure type indicative of the type of a failure, a failed node identifier indicative of a node at which a failure has occurred, a time stamp, and a plurality of failed link identifiers indicative of links suffering failures and the status of these links.

As shown in FIG. 7B, a response to the failure information message as described above includes a common header and a response message identifier indicative of a failure information response message.

When the optical cross-connects 13, 14, and 15 detect failures, failure detection signals are transmitted to the control nodes 33, 34, and 35. As three failure detection signals are reported to the control plane 45, there is a need to discern these signals. To this end, the failure information transmitted by the control nodes 33, 34, and 35 are provided with respective time stamps. As the failure information messages are exchanged in the control plane, it is found that the time stamp of the control node 33 indicates the earliest time. This makes it possible to detect that the failure occurred on a link between the optical cross-connects 32 and 33. In this case, there is no need to exchange the messages both ways between the control nodes, thereby reducing a delay associated with the failure detection.

Figure 8:
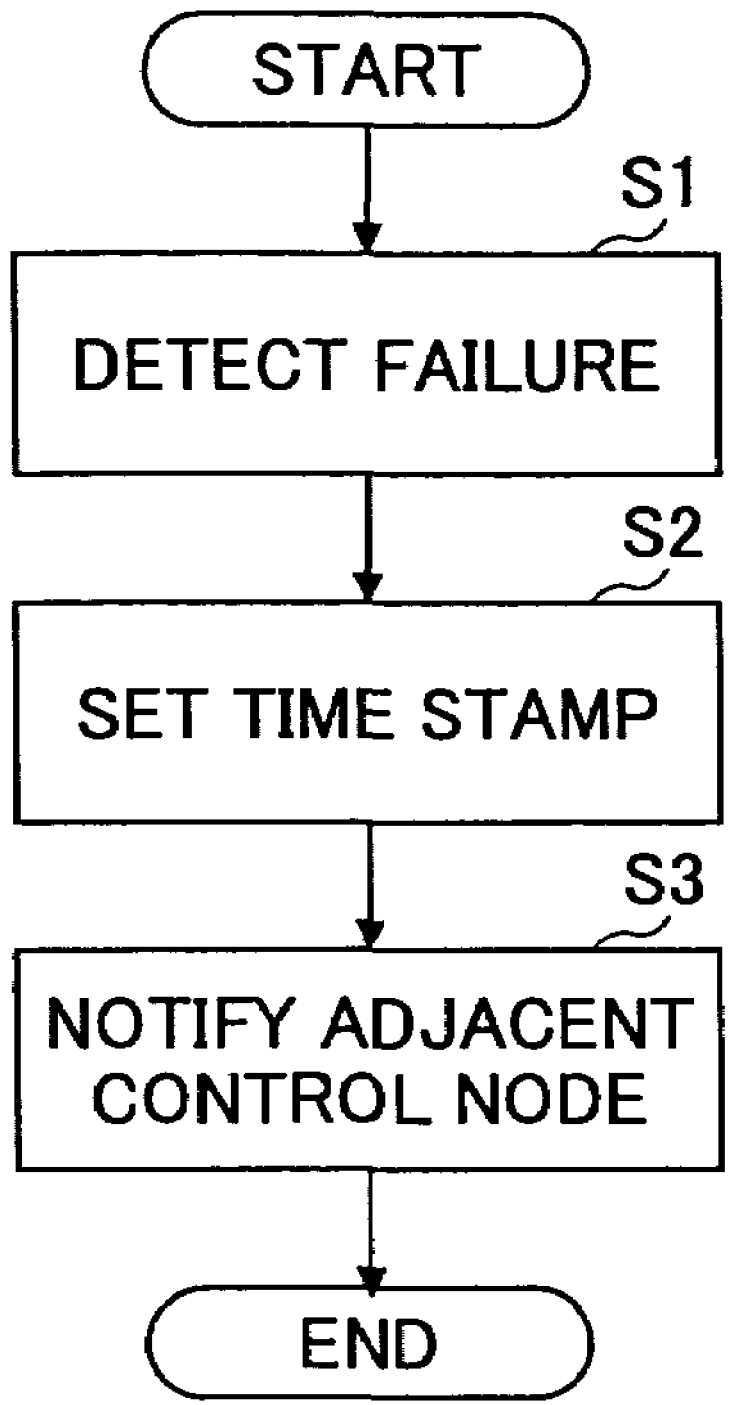
FIG. 8 is a flowchart showing a first embodiment of a failure detecting process performed by the failure management unit of a control node as it receives a failure detection signal from a communication node.

FIG. 8 is a flowchart showing a first embodiment of a failure detecting process performed by the failure management unit 56 of a control node as it receives a failure detection signal from the communication node. At step S1, failure is detected as a failure detection signal is received from the communication node. At step S2, a failure information message is generated, with a time stamp being set to a time at which the failure detection signal is received. In this failure information message, the ID of the control node of interest is set in the failed node identifier that indicates the location of the failure. At step S3, the failure information message is transmitted to the adjacent control nodes connected to the control node of interest through the external interface unit 51.

Figure 9:
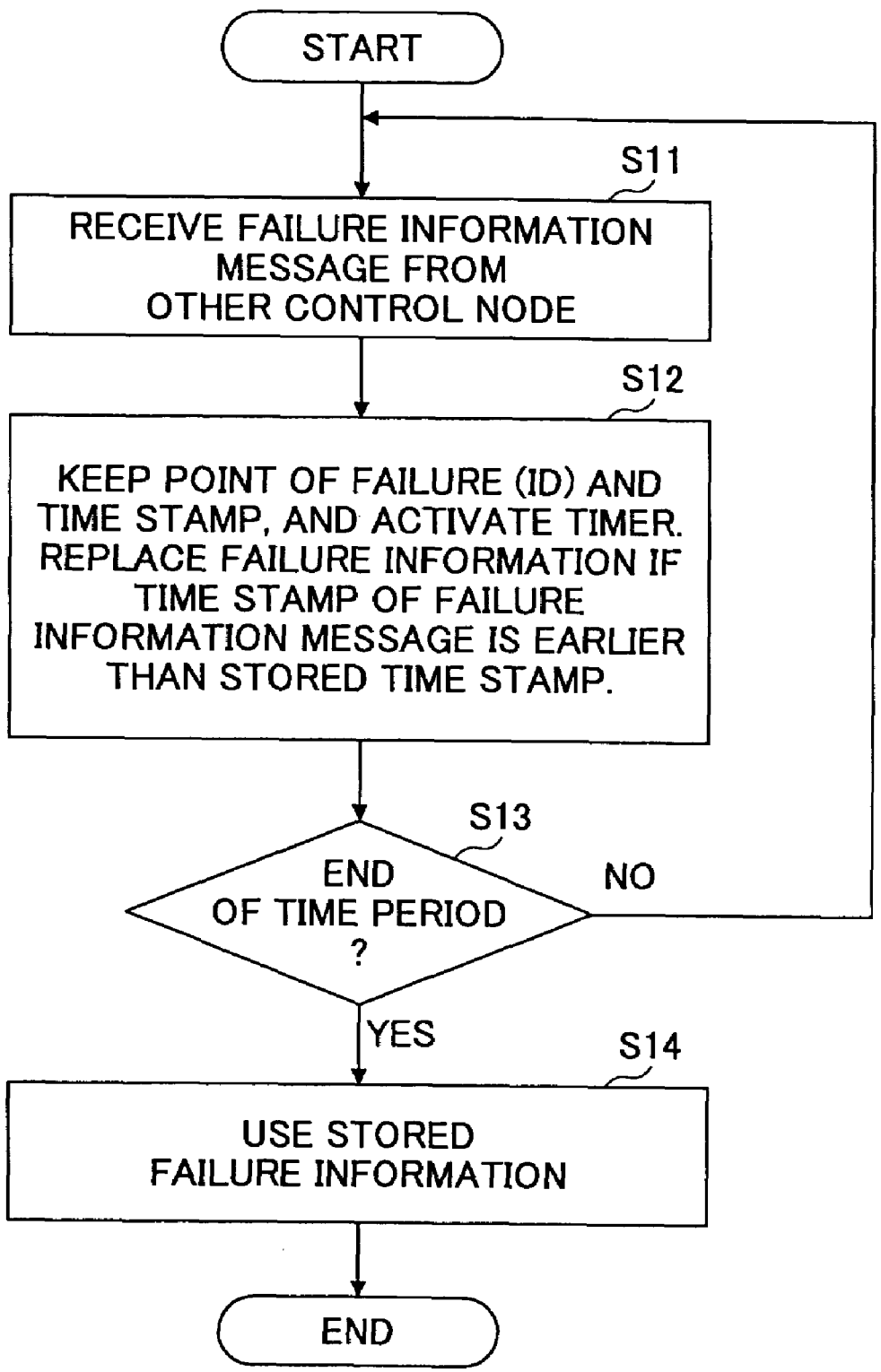
FIG. 9 is a flowchart showing the first embodiment of the failure detecting process performed by the failure management unit of a control node as it receives a failure information message from another control node.

FIG. 9 is a flowchart showing the first embodiment of the failure detecting process performed by the failure management unit 56 of a control node as it receives a failure information message from another control node. It should be noted that failure information is cleared at the time this process starts. At step S11, a failure information message is received from another control node. At step S12, the ID of the failed point and the time stamp included in the failure information message are kept as failure information if the failure information is in a cleared state, and a timer is activated. If the failure information is already present, the time stamp of the failure information message is compared with the time stamp of the existing failure information. Only if the time stamp of the failure information message is earlier, are the ID of the failed point and the time stamp included in the failure information message kept as updated failure information.

At step S13, a timer is checked to determine whether a predetermined time period has passed. If it has not, the procedure goes back to step S11 and repeats steps S11 through S13. If the predetermined time period has passed, the procedure goes to step S14, at which the currently held failure information is determined as the point of failure. The predetermined time period is set to a period that is longer than a sum of an information delay between adjacent control nodes (i.e., a delay of information propagating between adjacent control nodes) and a processing time at a control node. The failure information message transmitted from a control node may be converted from an electrical signal into an optical signal, to be transmitted to an adjacent control node together with an optical signal of the transport plane, for subsequent conversion from an optical signal into an electrical signal. If such a roundtrip configuration is used, the delay time should include a time delay required for the roundtrip.

Figure 10:
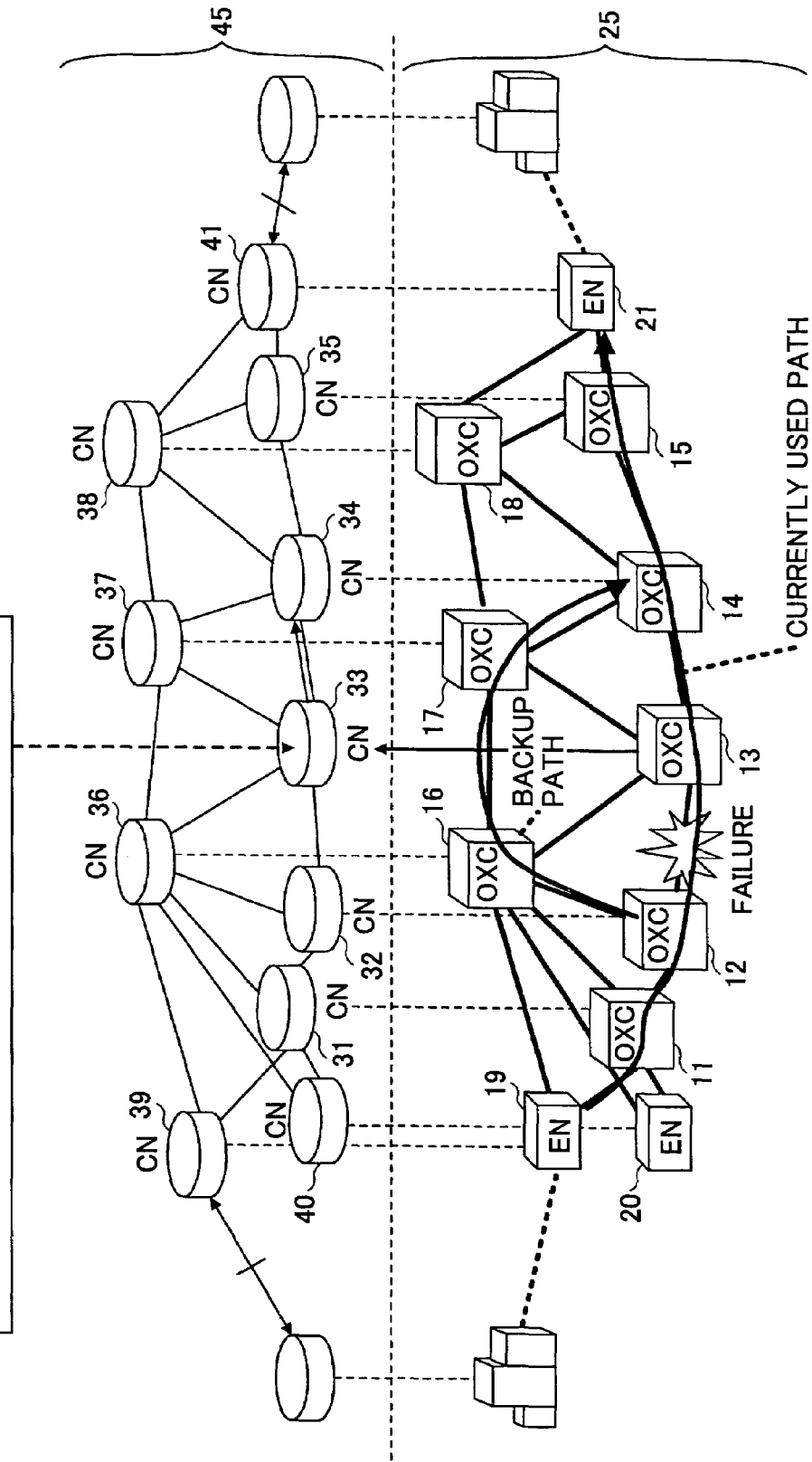
FIG. 10 is an illustrative drawing showing the construction of a network for explaining a second embodiment of a method of detecting a link failure according to the invention.

FIG. 10 is an illustrative drawing showing the construction of a network for explaining a second embodiment of a method of detecting a link failure according to the invention. In FIG.

10, the same elements as those of FIG. 2 are referred to by the same numerals. In FIG. 10, the control node 33 having detected a failure transmits a failure information message having the format as shown in FIG. 7A for the purpose of notifying of the occurrence of a failure. This transmission is directed to the control node 34 provided downstream on the path on which the failure is detected. Having received the failure information message, the control node 34 recognizes that a failure has occurred upstream on the above-noted path.

The control node of interest can ascertain that its own node position is the point of link failure if the failure information message is transmitted downstream and if no failure information message is received from upstream on the path.

Furthermore, a timer is provided that starts at the time of failure detection, and the determination that its own position is the point of failure is made when the timer indicates the passage of a predetermined time period. This predetermined time period is set to a time length longer than a delay that is equivalent to signal propagation to an adjacent control node. With this provision, failure is identified in a time frame equivalent to one-way signal propagation, without exchanging a message both ways with the adjacent control node.

Figure 11:
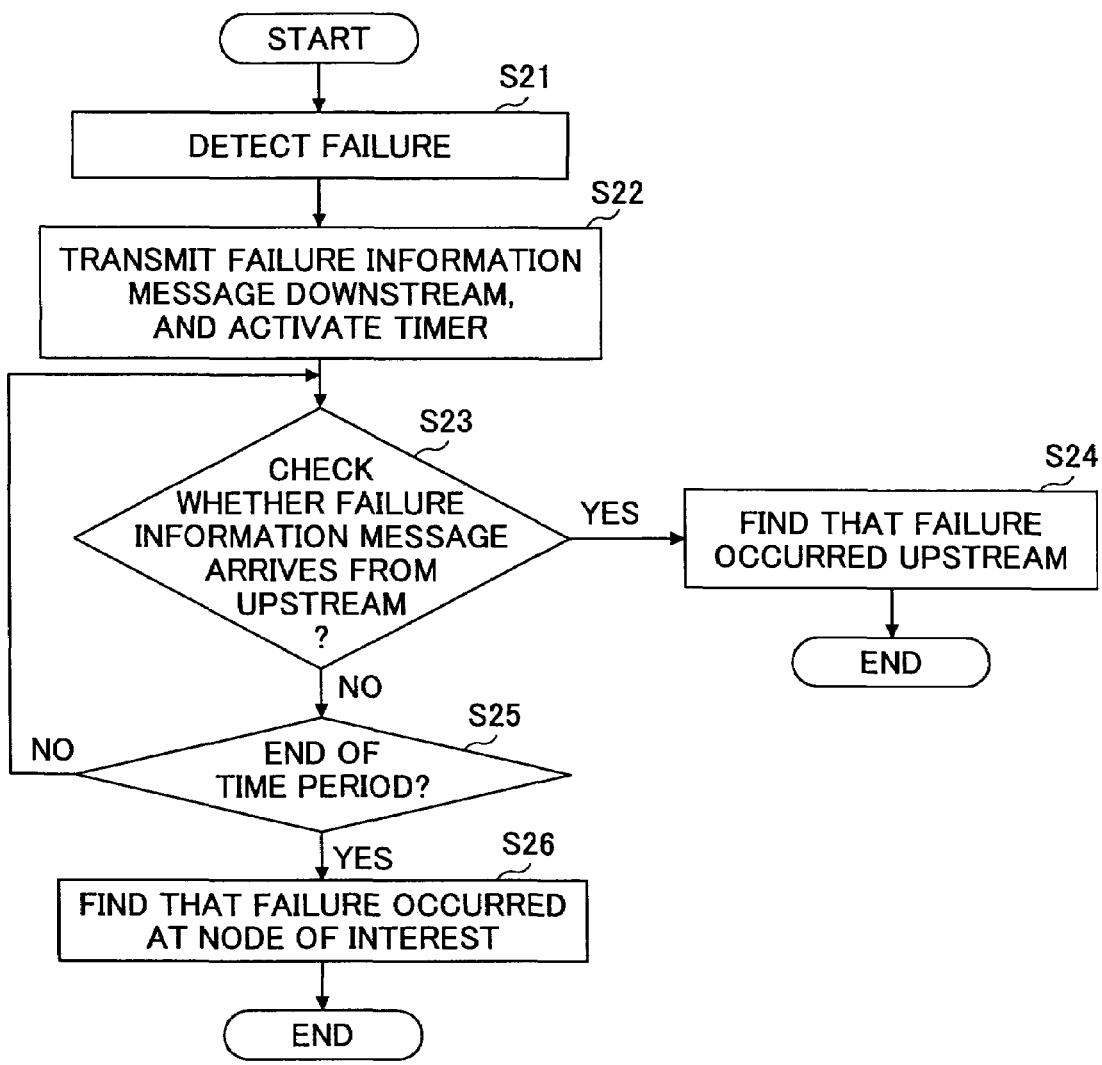
FIG. 11 is a flowchart showing a second embodiment of a failure detecting process performed by the failure management unit of a control node as it receives a failure detection signal from the communication node.

FIG. 11 is a flowchart showing a second embodiment of a failure detecting process performed by the failure management unit 56 of a control node as it receives a failure detection signal from the communication node. At step S21, failure is detected as a failure detection signal is received from the communication node. At step S22, a failure information message is generated and transmitted to the adjacent control node provided downstream relative to the control node of interest, with the activation of a timer.

At step S23, a check is made as to whether a failure information message arrives from the control node provided upstream relative to the control node of interest. If a failure information message arrives from the upstream control node, the procedure goes to step S24, at which it is ascertained that the failure occurred at a communication node situated upstream. If no failure information message arrives from the upstream control node, the procedure goes to step S25, at which a check is made as to whether the timer indicates the passage of a predetermined time period.

If the time period has not yet passed, the procedure goes back to step S23 and repeats steps S23-S25. If the time period has passed, the procedure goes to step S26, at which it is ascertained that the failure occurred at the communication node connected to the control node of interest.

The predetermined time period is set to a period that is longer than a sum of an information delay between adjacent control nodes and a processing time at a control node. The failure information message transmitted from a control node may be converted from an electrical signal into an optical signal, to be transmitted to an adjacent control node together with an optical signal of the transport plane, for subsequent conversion from an optical signal into an electrical signal. If such a roundtrip configuration is used, the delay time should include a time delay required for the roundtrip.

Figure 12:
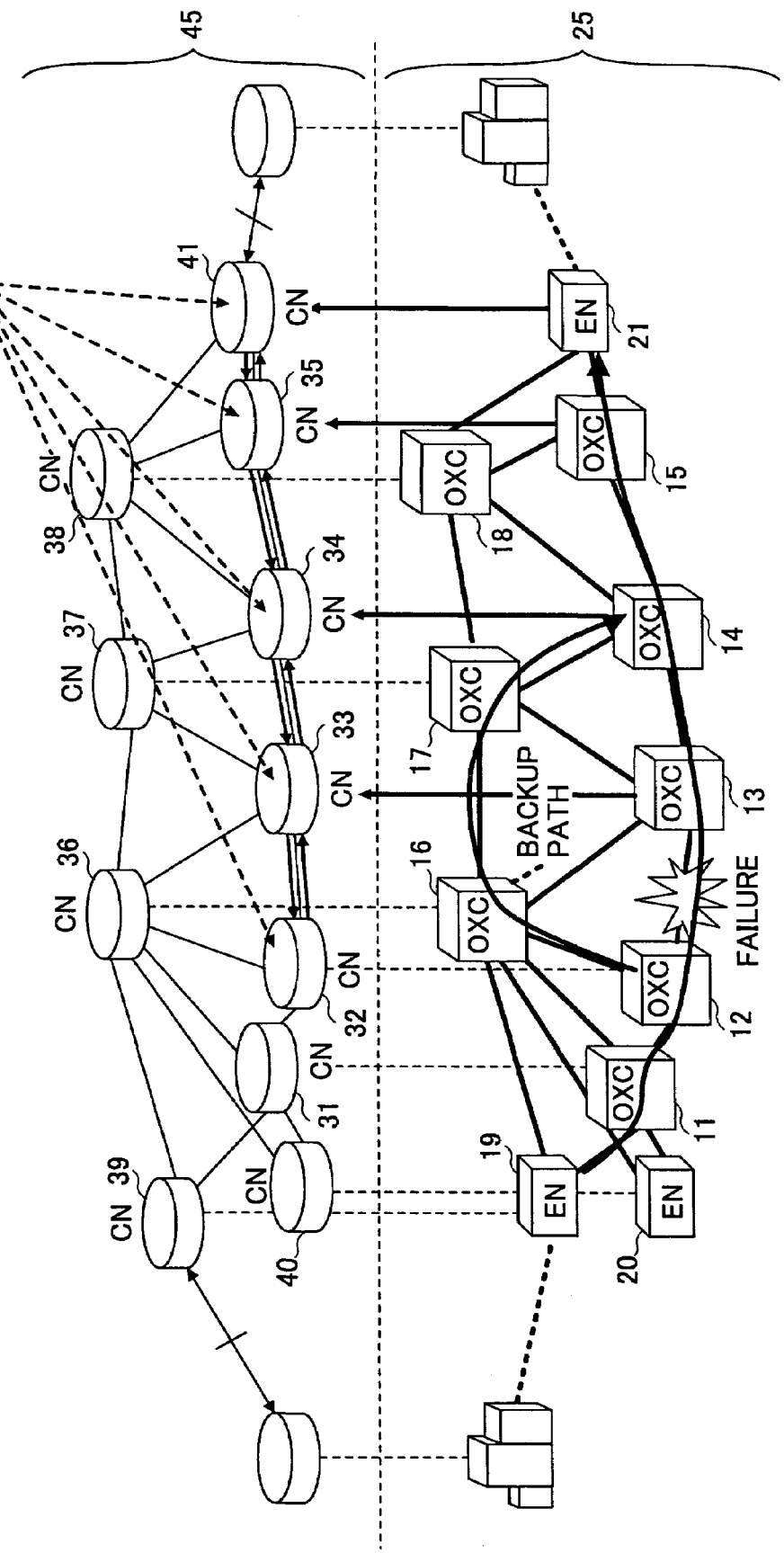
FIG. 12 is an illustrative drawing showing the construction of a network for explaining a third embodiment of a method of detecting a link failure according to the invention.

FIG. 12 is an illustrative drawing showing the construction of a network for explaining a third embodiment of a method of detecting a link failure according to the invention. In FIG. 12, the same elements as those of FIG. 2 are referred to by the same numerals. In FIG. 12, each of the control nodes 33, 34, 35, and 41 having detected a failure transmits a failure information message for the purpose of notifying of failure occurrence to the control nodes 32, 33, 34, and 35 provided upstream. Having detected the failure information message, each of the control nodes 32, 33, 34, and 35 transmits a response message to the downstream control nodes 33, 34, 35, and 41. Here, the response message indicates whether a failure is detected at its own control node.

FIGS. 13A and 13B are drawings showing the format of a failure information message and the format of a response message according to the second embodiment. As shown in FIG. 13A, the failure information message includes a common header and a message identifier indicative of a failure information message.

As shown in FIG. 13B, a response message responsive to the failure information message as described above includes a common header of the communication protocol used by control nodes, a message identifier indicative of a message responsive to a failure information message, a life time indicative of the number of nodes for which transfer is possible, a failure type indicative of the type of a failure, a failed node identifier indicative of a node at which a failure has occurred, a time stamp, and a plurality of failed link identifiers indicative of links suffering failures and the status of these links.

Amongst the downstream control nodes 33, 34, 35, and 41 which received the response message, the control node 33 ascertains that a failure has occurred on a link between the control nodes 32 and 33 because the control node 32 situated immediately upstream does not detect a failure. That is, it is ascertained that the control node 33 is the point of link failure.

Figure 14:
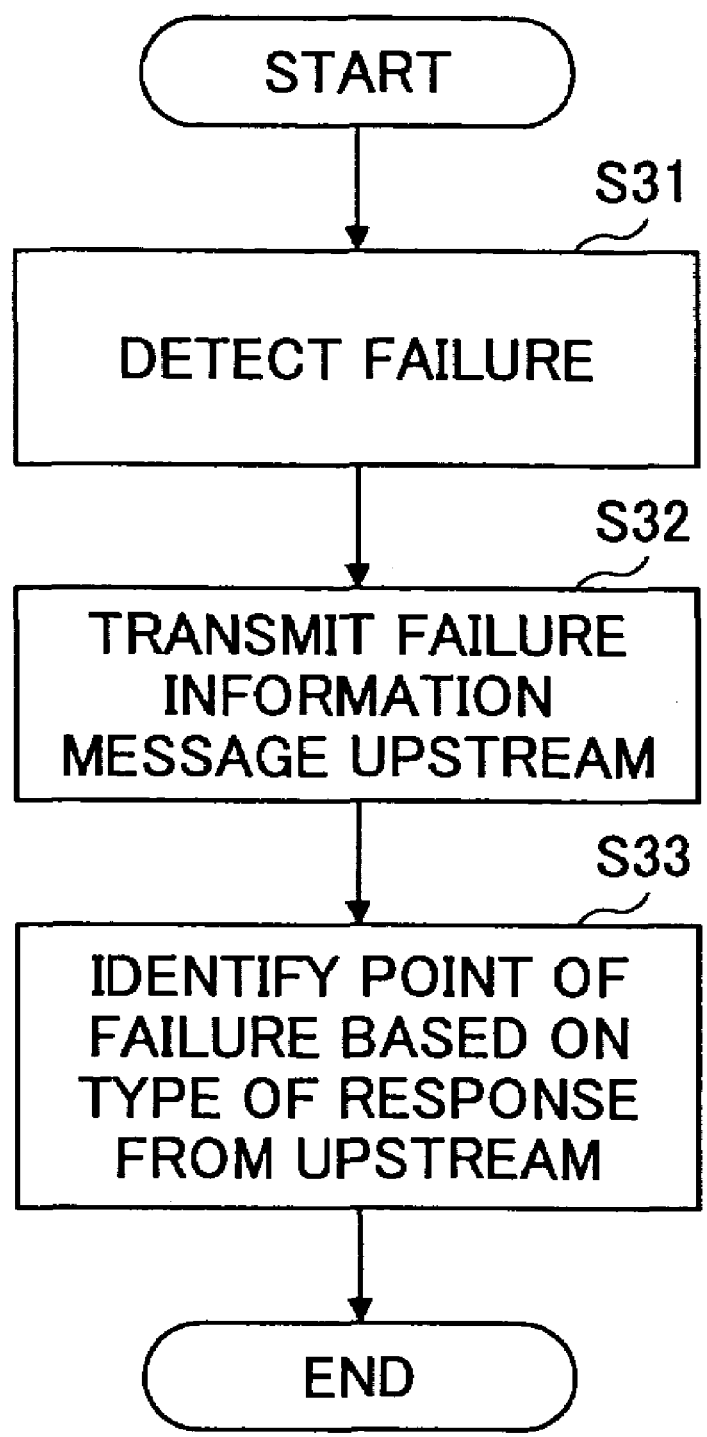
FIG. 14 is a flowchart showing a third embodiment of a failure detecting process performed by the failure management unit of a control node as it receives a failure detection signal from the communication node.

FIG. 14 is a flowchart showing a third embodiment of a failure detecting process performed by the failure management unit 56 of a control node as it receives a failure detection signal from the communication node. At step S31, failure is detected as a failure detection signal is received from the communication node. At step S32, a failure information message is generated and transmitted to the adjacent control node provided upstream relative to the control node of interest. At step S33, a response message responding to the failure information message is received from the upstream control node, and it is ascertained that the control node of interest is the point of failure if the response message indicates the detection of no failure.

Figure 15:
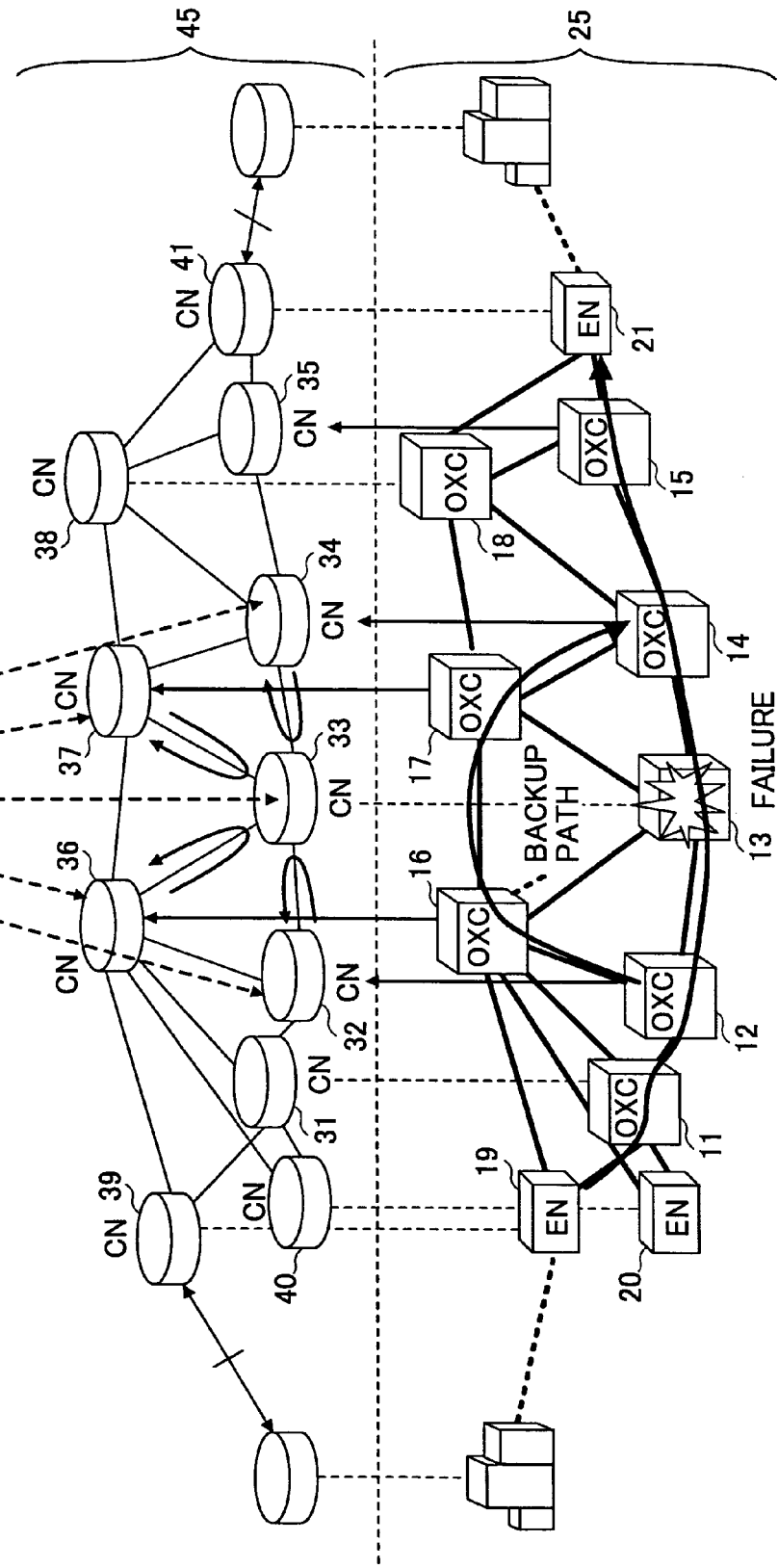
FIG. 15 is an illustrative drawing showing the construction of a network for explaining a fourth embodiment of a method of detecting a node failure according to the invention.

FIG. 15 is an illustrative drawing showing the construction of a network for explaining a fourth embodiment of a method of detecting a node failure according to the invention. In FIG. 15, the same elements as those of FIG. 2 are referred to by the same numerals. In FIG. 15, the optical cross-connect 13 in the transport plane 25 suffers a node failure, and the downstream control nodes 32, 34, 36, and 37 relevant to the failure send an inquiry to the upstream control node 33 by use of a failure information message shown in FIG. 13A. The upstream control node 33 notifies of the failure of the optical cross-connect 13 that the control node 33 controls in the transport plane, thereby allowing the node failure to be identified.

In this case, the control node 33 is able to appraise whether the optical cross-connect 13 is suffering a failure. In response to the failure information message from the control nodes 32, 34, 36, and 37, the control node 33 sends an inquiry to the optical cross-connect 13. If the optical cross-connect 13 does not respond to the inquiry, the control node 33 ascertains that the optical cross-connect 13 is suffering a failure, and sets its node ID in the failed node identifier of a response message shown in FIG. 13B. The response message is then sent to the adjacent control nodes 32, 34, 36, and 37. Alternatively, the control node 33 itself may determine that the optical cross-connect 13 is suffering a failure.

Figure 16:
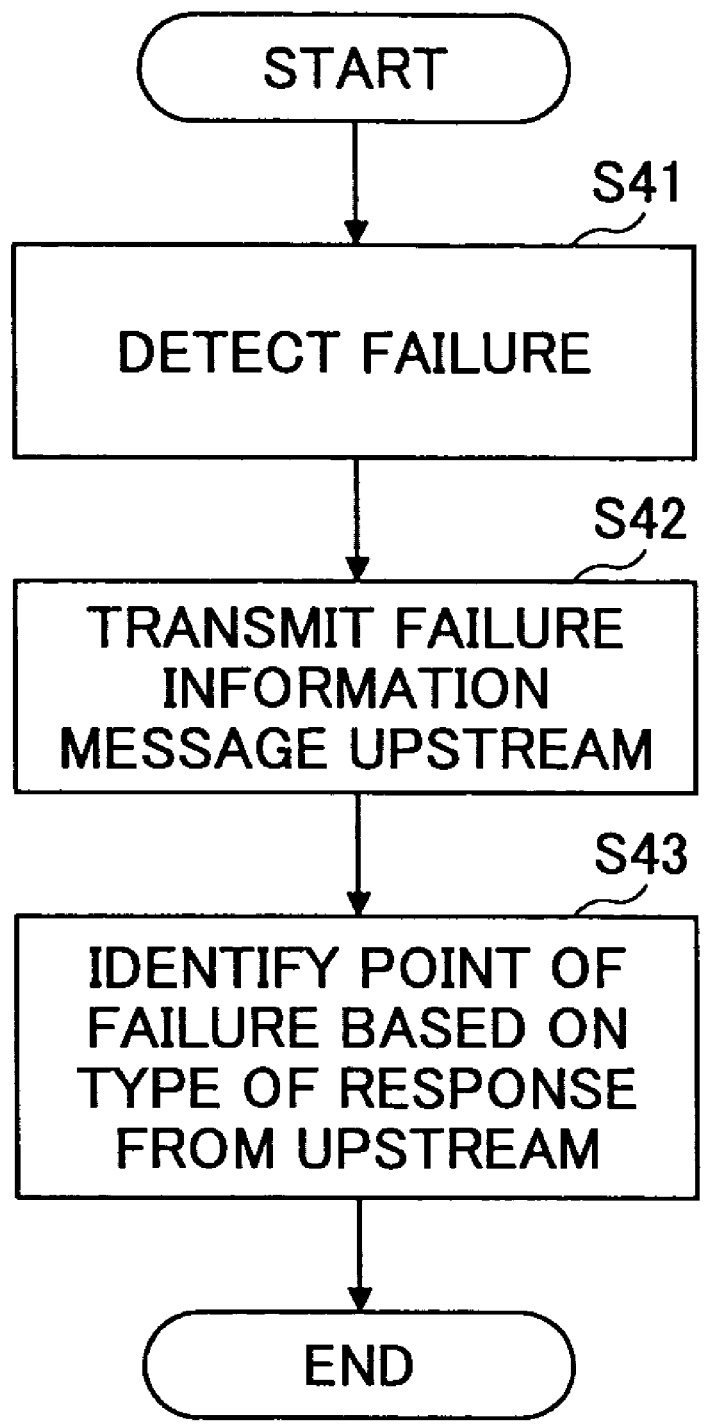
FIG. 16 is a flowchart showing a fourth embodiment of a failure detecting process performed by the failure management unit of a control node as it receives a failure detection signal from the communication node.

FIG. 16 is a flowchart showing a fourth embodiment of a failure detecting process performed by the failure management unit 56 of a control node as it receives a failure detection signal from the communication node. At step S41, failure is detected as a failure detection signal is received from the communication node. At step S42, a failure information message is generated and transmitted to the adjacent control node provided upstream relative to the control node of interest. At step S43, a response message responding to the failure information message is received from the upstream control node, thereby checking whether the failure is a link failure.

Figure 17:
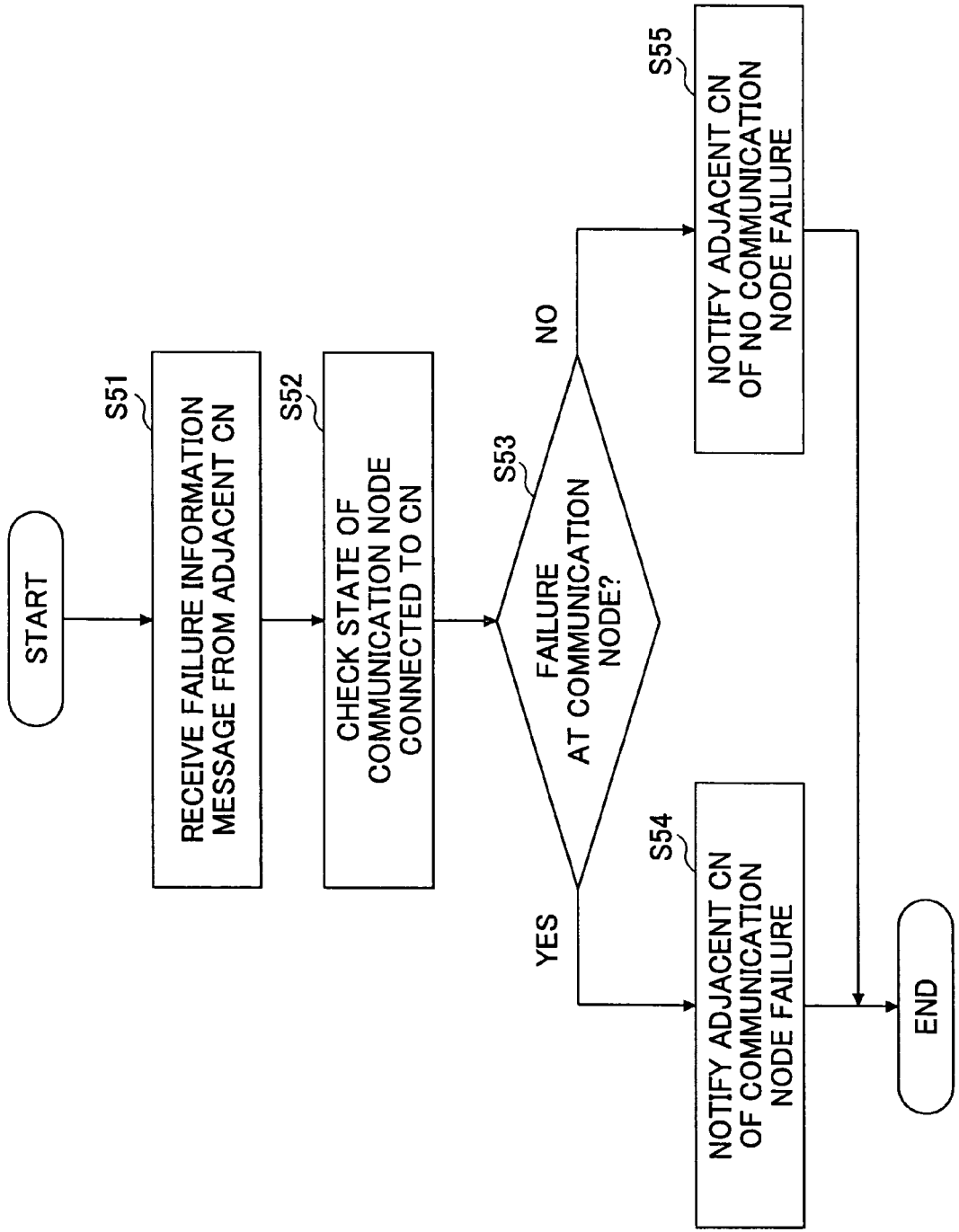
FIG. 17 is a flowchart showing the fourth embodiment of the failure detecting process performed by the failure management unit of a control node as it receives a failure information message from an adjacent control node.

FIG. 17 is a flowchart showing the fourth embodiment of the failure detecting process performed by the failure management unit 56 of a control node as it receives a failure information message from an adjacent control node. At step S51, a failure information message is received from an adjacent control node. At step S52, an inquiry is made to the communication node connected to the control node of interest by use of a failure information message shown in FIG. 13A, thereby checking the status of the communication node.

At step S53, a check is made as to whether the communication node connected to the control node of interest is suffering a failure. If the communication node suffers a failure, the node ID of the communication node is set at step S54 in the failed node identifier of a response message shown in FIG. 13B, and the response message is transmitted to notify the adjacent control node that it is a node failure. If the communication node does not suffer a failure, on the other hand, a response message indicative of no node failure is transmitted at step S55 to the adjacent control node.

Figure 18:
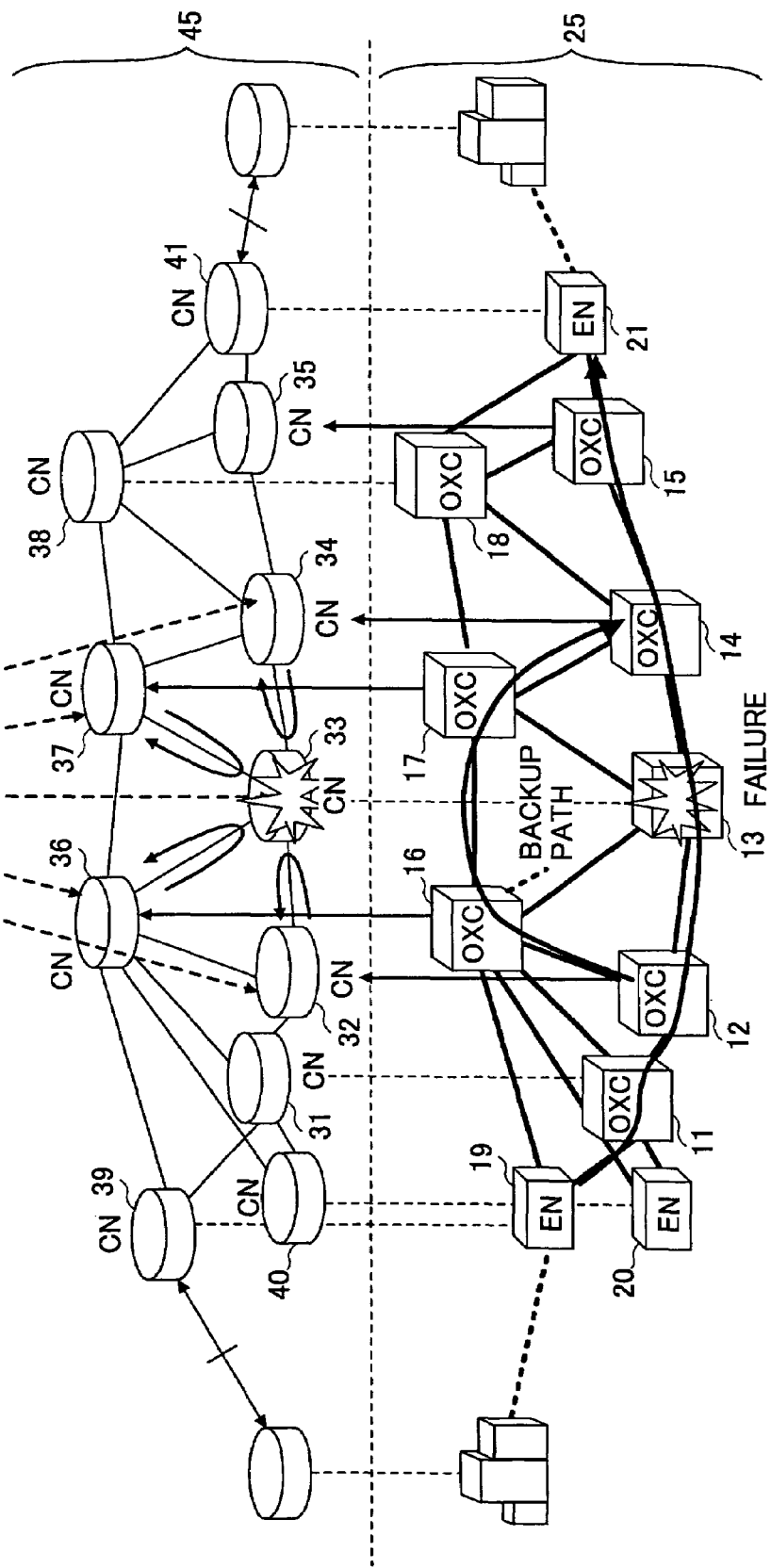
FIG. 18 is an illustrative drawing showing the construction of a network for explaining a fifth embodiment of a method of detecting a node failure according to the invention.

FIG. 18 is an illustrative drawing showing the construction of a network for explaining a fifth embodiment of a method of detecting a node failure according to the invention. In FIG. 18, the same elements as those of FIG. 2 are referred to by the same numerals. In FIG. 18, both the optical cross-connect 13 in the transport plane 25 and the control node 33 connected thereto suffer a failure, and the downstream control nodes 32, 34, 36, and 37 relevant to the failure send an inquiry to the upstream control node 33 by use of a failure information message shown in FIG. 13A. If there is no response from the upstream control node 33, it is ascertained that the upstream control node 33 and the optical cross-connect 13 connected thereto are the point of failure.

Figure 19:
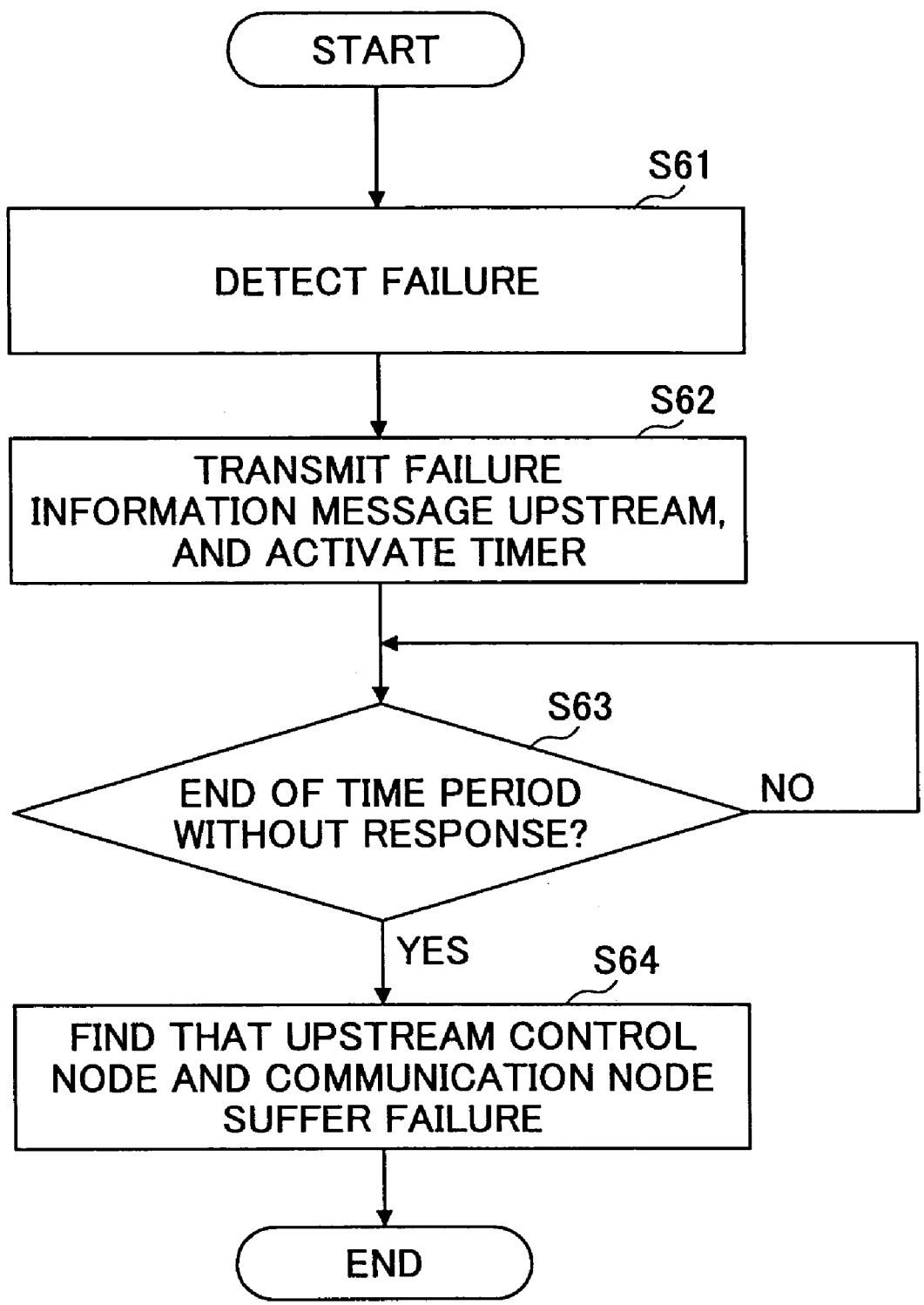
FIG. 19 is a flowchart showing a fifth embodiment of a failure detecting process performed by the failure management unit of a control node as it receives a failure detection signal from the communication node.

FIG. 19 is a flowchart showing a fifth embodiment of a failure detecting process performed by the failure management unit 56 of a control node as it receives a failure detection signal from the communication node. At step S61, failure is detected as a failure detection signal is received from the communication node. At step S62, a failure information message as shown in FIG. 13A is generated and transmitted to the adjacent control node provided upstream relative to the control node of interest, with the activation of a timer.

At step S63, if a response message as shown in FIG. 13B responding to the failure information message is not provided from the upstream control node and if the timer indicates the passage of a predetermined time period, it is ascertained at step S64 that the upstream control node and the communication node connected thereto are the point of failure.

The predetermined time period is set to a period that is longer than a sum of an information delay between adjacent control nodes and a processing time at a control node. The failure information message transmitted from a control node may be converted from an electrical signal into an optical signal, to be transmitted to an adjacent control node together with an optical signal of the transport plane, for subsequent conversion from an optical signal into an electrical signal. If such a roundtrip configuration is used, the delay time should include a time delay required for the roundtrip.

Figure 20:
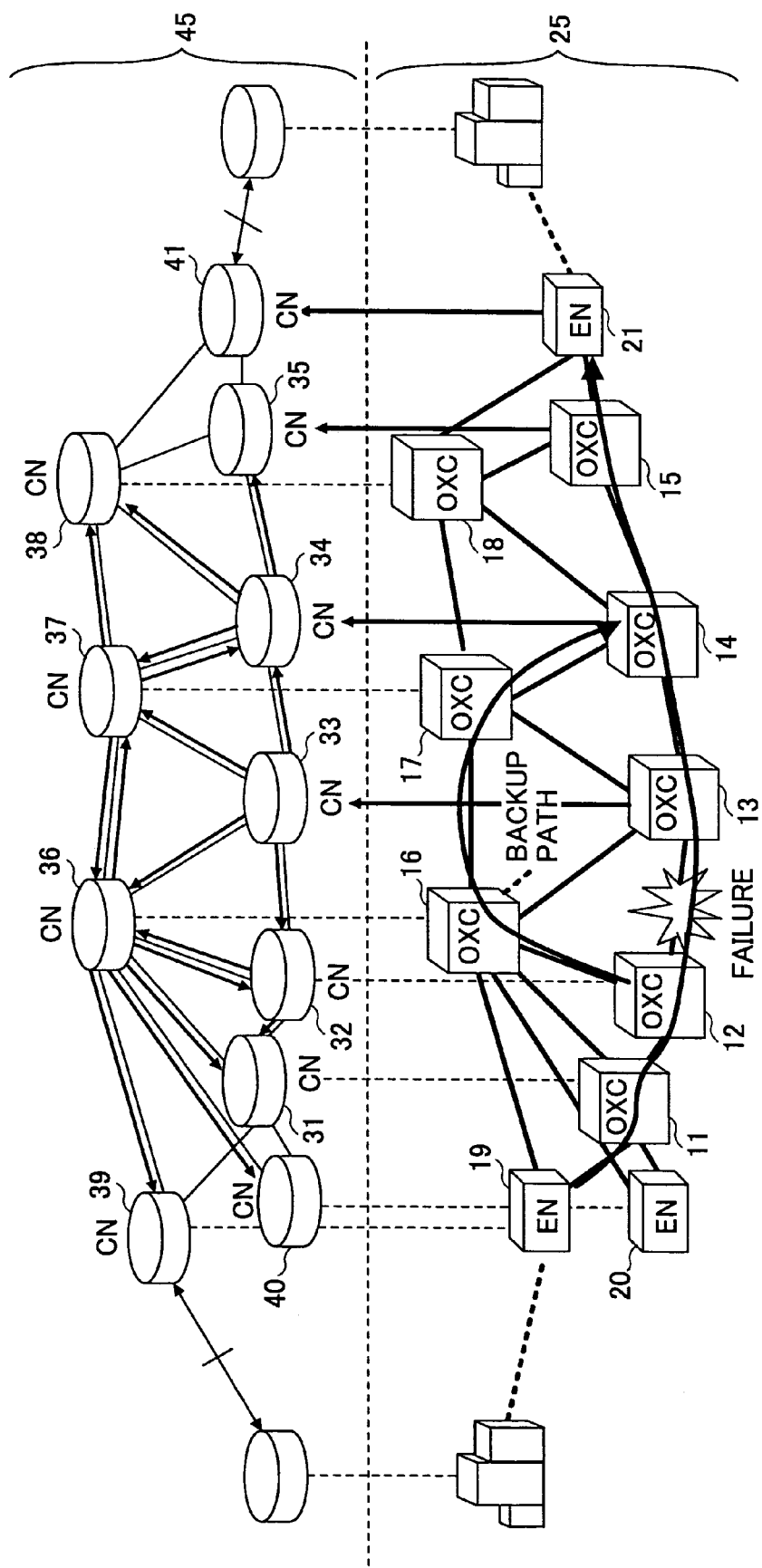
FIG. 20 is an illustrative drawing showing the construction of a network for explaining a sixth embodiment of a method of detecting a link failure and switching to a backup path according to the invention.

FIG. 20 is an illustrative drawing showing the construction of a network for explaining a sixth embodiment of a method of detecting a link failure and switching to a backup path according to the invention. In FIG. 20, the same elements as those of FIG. 2 are referred to by the same numerals. In FIG. 20, the control node 33 detects a failure by receiving a failure detection signal from the communication node, and generates a failure information message having the format shown in FIG. 7A for the notification of a failure occurrence. The time stamp of the failure information message is set to a time at which the failure detection signal is received. As a point of failure, the ID of the control node of interest is set in the failed node identifier. A link with the optical cross-connect 12 is set in a failed link identifier as a link on which a failure has occurred. Then, "flooding" is performed. The term "flooding" refers to the transmission of a failure information message from all the ports except for the port which received the failure information message.

As a result, the failure information message is transmitted from the control node 33 to each of the adjacent control nodes 32, 34, 36, and 37. Having received this failure information message, the control nodes 32, 34, 36, and 37 also perform the flooding of the failure information message, so that the failure information message is all over the network Each control node puts trust in a failure information message with a time stamp that is earliest among a plurality of received failure information messages, and establishes a backup path that bypasses the point of failure indicated by the failure information message having the earliest time stamp. In FIG. 20, the control nodes 32, 34, 36, and 37 each detect the point of failure, and control the respective optical cross-connects 12, 14, 16, and 17 so as to switch to the backup path. Alternatively, the backup path may be established in advance, rather than being established at the time of occurrence of failure.

Further, the present invention is not limited to these embodiments, but various variations and modifications may be made without departing from the scope of the present invention.

The present application is based on Japanese priority application No. 2003-410257 filed on Dec. 9, 2003, with the Japanese Patent Office, the entire contents of which are hereby incorporated by reference.

What is claimed is:

1. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

transmitting, from a control node connected to a transport node having detected a failure to an adjacent control node, a failure information message having a time indication indicative of a time at which the failure is detected;

receiving, at a given control node, failure information messages transmitted from other control nodes;

comparing, at the given control node, time indications of the failure information messages transmitted from the other control nodes to find a time indication indicative of an earliest time; and identifying, at the given control node, a location of the failure based on a location of the control node that has originally transmitted the failure information message having the time indication indicative of the earliest time.

2. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

transmitting a failure information message from a control node connected to a transport node having detected a failure to a control node that is situated downstream on a path along which the failure is detected;

checking, at a given control node that has transmitted a failure information message, whether a predetermined time period has passed without receiving a failure information message from an upstream control node on the path; and identifying the given control node as a location of the failure upon concurrent occurrence of both a detection of a passage of the predetermined time period and a detection of an absence of receipt of the failure information message from the upstream control node on said path;

comparing, at another given control node, time indications of the failure information messages transmitted from other control nodes to find a time indication indicative of an earliest time; and identifying, at the other given control node, the location of the failure based on a location of the control node that has originally transmitted the failure information message having the time indication indicative of the earliest time.

3. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

transmitting a failure information message from a control node connected to a transport node having detected a failure to a control node that is situated upstream on a path along which the failure is detected;

checking, at a given control node that has transmitted a failure information message, whether a predetermined time period has passed without receiving a response from an upstream control node on the path; and identifying the upstream control node as a location of the failure upon concurrent occurrence of both a detection of a passage of the predetermined time period and a detection of an absence of receipt of the response from the upstream control node;

comparing, at another given control node, time indications of the failure information messages transmitted from other control nodes to find a time indication indicative of an earliest time; and identifying, at the other given control node, the location of the failure based on a location of the control node that has originally transmitted the failure information message having the time indication indicative of the earliest time.

4. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

transmitting a failure information message from a control node connected to a transport node having detected a failure to a control node that is situated upstream on a path along which the failure is detected;

checking, at a given control node having received the failure information message, whether a transport node connected thereto suffers a failure and comparing time indications of the failure information messages transmitted from the other control nodes to find a time indication indicative of an earliest time;

transmitting a result of the checking from the given control node to a control node from which the failure information message is received, wherein the result of the checking includes one of a result indicative of presence of failure and a result indicative of absence of failure, the transmitted result of the checking being a result indicative of absence of failure upon detecting no failures; and identifying the failure based on the result of the checking and comparing.

5. A control node for detecting a failure in a network, which includes a transport plane comprised of a plurality of transport nodes performing optical cross-connect and a control plane comprised of a plurality of control nodes that are connected to and control the respective transport nodes, said control node comprising:

a failure information message transmitting unit which generates a failure information message having a time indication indicative of a time at which a failure is detected in response to a notice supplied from a transport node connected to said control node, and transmits the failure information message to an adjacent control node; and a failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

6. The method as claimed in claim 2, wherein said step of transmitting a failure information message includes activating a timer at a same timing as the failure information message is transmitted, and said step of identifying a given control node identifies the given control node as a location of the failure if the given control node has transmitted the failure information message and has not received the failure information message from upstream on said path within a time period specified by the timer.

7. The method as claimed in claim 6, wherein the time period specified by the timer is longer than a sum of an information delay between adjacent control nodes and a processing time at a control node.

8. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

transmitting a failure information message from a control node connected to a transport node having detected a failure to a control node that is situated upstream on a path along which the failure is detected;

transmitting, from a control node having received the failure information message, a response indicative of presence or absence of failure detection to a downstream control node on the path, wherein the response includes one of a result indicative of presence of failure and a result indicative of absence of failure, the transmitted response being a response indicative of absence of failure detection upon detecting no failures; and identifying a given control node as a location of the failure if the given control node receives a response indicative of absence of failure from an upstream control node to which the given control node has transmitted the failure information message;

comparing, at another given control node, time indications of the failure information messages transmitted from other control nodes to find a time indication indicative of an earliest time; and identifying, at the other given control node, the location of the failure based on a location of the control node that has originally transmitted the failure information message having the time indication indicative of the earliest time.

9. A method of detecting a failure in a network, which includes a transport plane comprised of a plurality of transport nodes performing optical cross-connect and a control plane comprised of a plurality of control nodes that are connected to and control the respective transport nodes, said method comprising the steps of:

performing, from a control node connected to a transport node having detected a failure, flooding of a failure information message having a time indication indicative of a time at which the failure is detected;

receiving, at a given control node, failure information messages transmitted from other control nodes;

comparing, at the given control node, time indications of the failure information messages transmitted from other control nodes to find a time indication indicative of an earliest time; and identifying, at the given control node, a location of the failure based on a location of the control node that has originally transmitted the failure information message having the time indication indicative of the earliest time.

10. A control node for detecting a failure in a network, which includes a transport plane comprised of a plurality of transport nodes performing optical cross-connect and a control plane comprised of a plurality of control nodes that are connected to and control the respective transport nodes, said control node comprising:

a failure information message transmitting unit which generates a failure information message in response to a notice of detection of a failure supplied from a transport node connected to said control node, and transmits the failure information message downstream on a path along which the failure is detected; and a failure-point identifying unit which checks whether a predetermined time period has passed without receiving a failure information message from upstream on the path, and identifies said control node as a location of the failure upon concurrent occurrence of both a detection of a passage of the predetermined time period and a detection of an absence of receipt of the failure information message from upstream on the path, wherein one of the plurality of control nodes comprises another failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

11. A control node for detecting a failure in a network, which includes a transport plane comprised of a plurality of transport nodes performing optical cross-connect and a control plane comprised of a plurality of control nodes that are connected to and control the respective transport nodes, said control node comprising:

a failure information message transmitting unit which generates a failure information message in response to a notice of detection of a failure supplied from a transport node connected to said control node, and transmits the failure information message to a control node provided upstream on a path along which the failure is detected; and a failure-point identifying unit which checks whether a predetermined time period has passed without receiving a response from the upstream control node on the path, and identifies the upstream control node as a location of the failure upon concurrent occurrence of both a detection of a passage of the predetermined time period and a detection of absence of receipt of the response from the upstream control node, wherein one of the plurality of control nodes comprises another failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

12. A control node for detecting a failure in a network, which includes a transport plane comprised of a plurality of transport nodes performing optical cross-connect and a control plane comprised of a plurality of control nodes that are connected to and control the respective transport nodes, said control node comprising:

a failure information message transmitting unit which generates a failure information message in response to a notice of detection of a failure supplied from a transport node connected to said control node, and transmits the failure information message upstream on a path along which the failure is detected; and a failure-point identifying unit which checks in response to receipt of the failure information message whether the transport node connected to said control node suffers a failure and transmits a result of the checking to a control node from which the failure information message is received, thereby identifying a location of the failure based on the result of the checking, wherein the result of the checking includes one of a result indicative of presence of failure and a result indicative of absence of failure, the transmitted result of the checking being a result indicative of absence of failure upon detecting no failures, wherein one of the plurality of control nodes comprises another failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

13. The control node as claimed in claim 10, further comprising a timer which is activated in response to receipt of the failure information message, wherein said failure-point identifying unit identifies said control node as a location of the failure if the failure information message is not received from upstream on the path within a time period specified by said timer.

14. The control node as claimed in claim 13, wherein the time period specified by the timer is longer than a sum of an information delay between adjacent control nodes and a processing time at a control node.

15. A control node for detecting a failure in a network, which includes a transport plane comprised of a plurality of transport nodes performing optical cross-connect and a control plane comprised of a plurality of control nodes that are connected to and control the respective transport nodes, said control node comprising:
- a failure information message transmitting unit which generates a failure information message in response to a notice of detection of a failure supplied from a transport node connected to said control node, and transmits the failure information message upstream on a path along which the failure is detected; and
- a failure-point identifying unit which transmits a response indicative of presence or absence of failure detection to downstream on the path in response to a failure information message sent from downstream on the path, the response including one of a result indicative of presence of failure and a result indicative of absence of failure, the transmitted response being a response indicative of absence of failure detection upon detecting no failures, and identifies said control node as a location of the failure if said control node receives a response indicative of absence of failure from an upstream control node to which said control node has transmitted the failure information message, wherein
- one of the plurality of control nodes comprises another failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

16. A control node for detecting a failure in a network, which includes a transport plane comprised of a plurality of transport nodes performing optical cross-connect and a control plane comprised of a plurality of control nodes that are connected to and control the respective transport nodes, said control node comprising:
- a failure information message flooding unit which generates a failure information message in response to a notice of detection of a failure supplied from a transport node connected to said control node, and performs flooding of the failure information message; and
- a failure-point identifying unit which compares time indications of failure information messages transmitted from other control nodes to find a time indication indicative of an earliest time, and identifies a location of the failure based on a location of the control node that has originally transmitted the failure information message having the time indication indicative of the earliest time.

* * * * *